US007909962B2

(12) United States Patent
Urscheler

(10) Patent No.: US 7,909,962 B2

(45) **Date of Patent: *Mar. 22, 2011**

(54) PROCESS FOR MAKING MULTILAYER COATED PAPER OR PAPERBOARD

(75) Inventor: Robert Urscheler, Horgen (CH)

(73) Assignee: Dow Global Technologies LLC

( * ) Notice: Subject to any disclaimer, the term of this patent is extended or adjusted under 35 U.S.C. 154(b) by 141 days.

This patent is subject to a terminal disclaimer.

(21) Appl. No.: 12/132,649

(22) Filed: Jun. 4, 2008

(65) Prior Publication Data

US 2008/0274365 A1 Nov. 6, 2008

Related U.S. Application Data

(63) Continuation of application No. 10/257,172, filed as application No. PCT/US02/12002 on Apr. 12, 2002, now Pat. No. 7,425,246.

(30) Foreign Application Priority Data

Apr. 14, 2001 (EP) .................................... 01109266

(51) Int. Cl.

*D21H 19/82* (2006.01)
*B05D 1/30* (2006.01)
*B32B 29/06* (2006.01)

(52) U.S. Cl. .................... 162/137; 162/158; 162/164.1; 162/169; 427/402; 427/411; 427/420; 428/195.1; 428/341; 428/537.5

(58) Field of Classification Search .................. 162/137, 162/158, 164.1, 169; 427/402, 411, 420; 428/195, 341, 537.5

See application file for complete search history.

(56) References Cited

U.S. PATENT DOCUMENTS

| | | | |
|---|---|---|---|
| 2,761,419 | A | 9/1956 | Mercier et al. |
| 3,005,440 | A | 10/1961 | Padday |
| 3,419,203 | A | 12/1968 | Amend |
| 3,436,022 | A | 4/1969 | Ernst |
| 3,508,947 | A | 4/1970 | Huges |
| 3,632,374 | A | 1/1972 | Greiller |
| 4,001,024 | A | 1/1977 | Dittman et al. |
| 4,041,897 | A | 8/1977 | Ade |
| 4,109,611 | A | 8/1978 | Fahrni et al. |
| 4,230,743 | A | 10/1980 | Nakamura et al. |
| 4,358,476 | A | 11/1982 | Zimmer et al. |
| 4,569,863 | A | 2/1986 | Koepke et al. |

(Continued)

FOREIGN PATENT DOCUMENTS

BE 852751 9/1977

(Continued)

OTHER PUBLICATIONS

D. Meck, et al., Non-impact coating in the curtain coater:, 20. Streicherel—Symposium 2001, p. 34-1 to 34-6, Germany (German language with English language abstract).

(Continued)

*Primary Examiner* — D. S Nakarani

(57) ABSTRACT

The present invention refers in one embodiment to a method of manufacturing multilayer coated papers and paperboards, but excluding photographic papers and pressure sensitive copying papers, that are especially suitable for printing, packaging and labeling purposes, in which at least two curtain layers selected from aqueous emulsions or suspensions are formed into a composite, free-falling curtain and a continuous web of basepaper or baseboard is coated with the composite curtain, and paper or paperboard thereby obtainable.

91 Claims, 5 Drawing Sheets

U.S. PATENT DOCUMENTS

Figure 1:
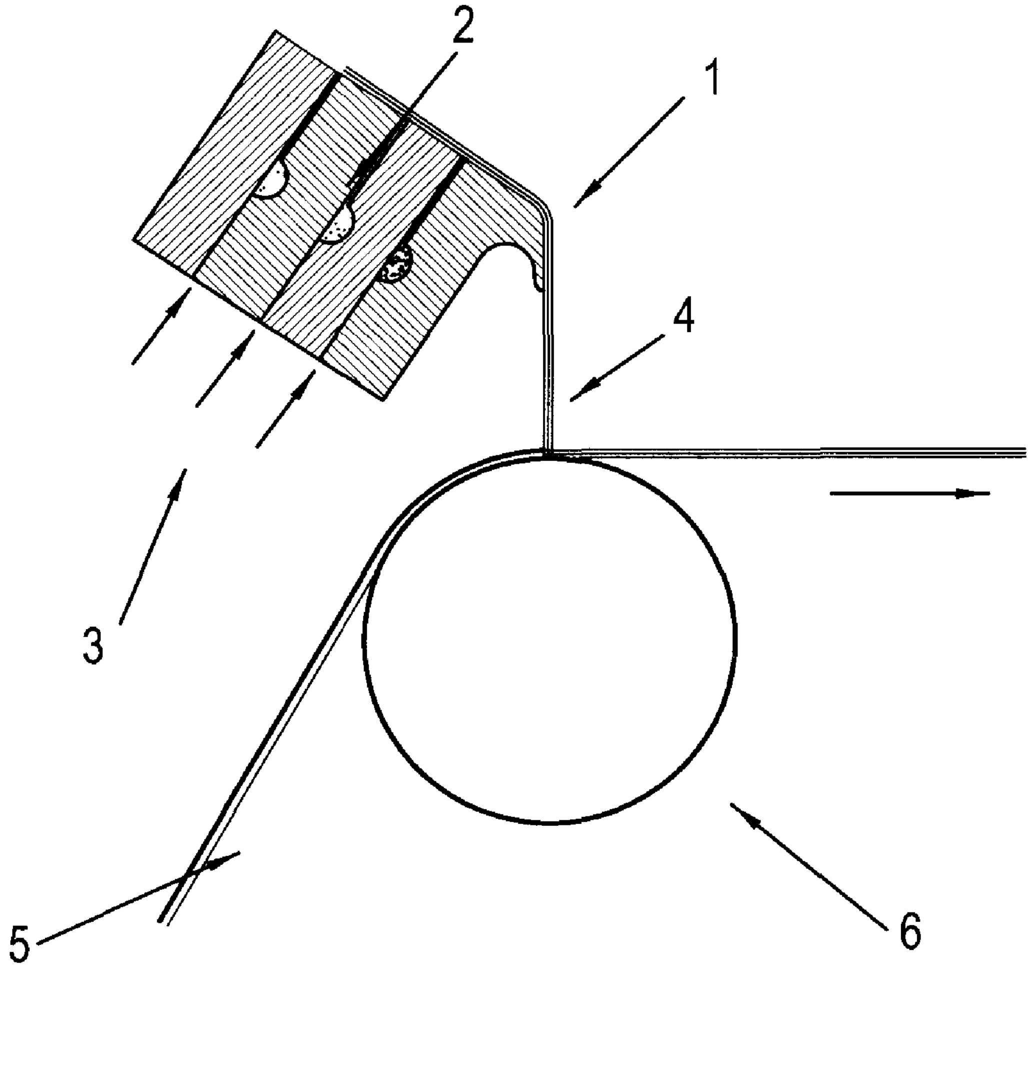

| | | | | |
|---|---|---|---|---|
| 4,710,270 | A | 12/1987 | Sunden | |
| 4,975,304 | A | 12/1990 | Kawahara et al. | |
| 5,118,533 | A | 6/1992 | Saji et al. | |
| 5,224,996 | A | 7/1993 | Ghys et al. | |
| 5,234,500 | A | 8/1993 | Korokeyi | |
| 5,236,744 | A | 8/1993 | Suga et al. | |
| 5,238,534 | A | 8/1993 | Manning et al. | |
| 5,270,355 | A | 12/1993 | Kawano et al. | |
| 5,290,672 | A | 3/1994 | Dunk | |
| 5,391,401 | A | 2/1995 | Blake et al. | |
| 5,393,571 | A | 2/1995 | Suga et al. | |
| 5,505,995 | A | 4/1996 | Leonard | |
| 5,506,000 | A | 4/1996 | Leonard | |
| 5,641,544 | A | 6/1997 | Melancon et al. | |
| 5,643,992 | A | 7/1997 | Northey | |
| 5,654,039 | A | 8/1997 | Wenzel et al. | |
| 5,733,608 | A | 3/1998 | Kessel et al. | |
| 5,773,093 | A | 6/1998 | Mitani et al. | |
| 5,789,031 | A | 8/1998 | Hirabayashi et al. | |
| 5,861,195 | A | 1/1999 | Bhave et al. | |
| 5,876,815 | A | 3/1999 | Sandstrom et al. | |
| 5,885,659 | A | 3/1999 | Takahashi et al. | |
| 6,060,206 | A | 5/2000 | Hanaki et al. | |
| 6,086,954 | A | 7/2000 | Kaufmann et al. | |
| 6,099,913 | A | 8/2000 | Clarke et al. | |
| 6,103,313 | A | 8/2000 | Clarke et al. | |
| 6,106,902 | A | 8/2000 | Koskinen et al. | |
| 6,120,784 | A | 9/2000 | Snyder | |
| 6,146,690 | A | 11/2000 | Kustermann | |
| 6,214,416 | B1 | 4/2001 | Sakagami | |
| 6,291,127 | B1 | 9/2001 | Dagan et al. | |
| 6,294,023 | B1 | 9/2001 | Katagiri et al. | |
| 6,335,085 | B1 | 1/2002 | Asano et al. | |
| 6,358,306 | B1 | 3/2002 | Hanada et al. | |
| 6,419,987 | B1 | 7/2002 | Bauer et al. | |
| 6,458,120 | B1 | 10/2002 | Shen et al. | |
| 6,458,413 | B1 * | 10/2002 | Hirabayashi et al. | 427/209 |
| 6,479,107 | B2 | 11/2002 | Katagiri et al. | |
| 6,548,120 | B1 * | 4/2003 | Wittosch et al. | 427/411 |
| 6,558,740 | B1 | 5/2003 | Santo et al. | |
| 6,562,441 | B1 | 5/2003 | Maeda et al. | |
| 6,579,569 | B2 | 6/2003 | Bermel et al. | |
| 6,607,786 | B2 | 8/2003 | Katagiri et al. | |
| 6,746,718 | B2 | 6/2004 | Yokota | |
| 6,780,455 | B2 | 8/2004 | Clarke et al. | |
| 6,824,828 | B2 | 11/2004 | Su et al. | |
| 6,982,003 | B2 | 1/2006 | Gueggi et al. | |
| 7,172,793 | B2 | 2/2007 | Cohu | |
| 7,208,068 | B2 | 4/2007 | Nisogi et al. | |
| 7,364,774 | B2 | 4/2008 | Urscheler et al. | |
| 7,425,246 | B2 * | 9/2008 | Urscheler | 162/137 |
| 2001/0008653 | A1 | 7/2001 | Katagiri et al. | |
| 2001/0016231 | A1 | 8/2001 | Bower | |
| 2002/0009549 | A1 | 1/2002 | Ogawa | |
| 2002/0066404 | A1 | 6/2002 | Ueberschar et al. | |
| 2002/0160121 | A1 | 10/2002 | Katagiri et al. | |
| 2003/0003197 | A1 | 1/2003 | Berlin et al. | |
| 2003/0064162 | A1 | 4/2003 | Clarke et al. | |
| 2003/0118739 | A1 | 6/2003 | Li et al. | |
| 2003/0149115 | A1 | 8/2003 | Garces et al. | |
| 2003/0180470 | A1 | 9/2003 | Oki et al. | |
| 2003/0188839 | A1 | 10/2003 | Urscheler | |
| 2003/0190432 | A1 | 10/2003 | Yokota et al. | |
| 2003/0194501 | A1 | 10/2003 | Urscheler | |
| 2003/0235657 | A1 | 12/2003 | Schweizer et al. | |
| 2004/0013815 | A1 | 1/2004 | Gros | |
| 2004/0052953 | A1 | 3/2004 | Cohu | |
| 2004/0121079 | A1 | 6/2004 | Urscheler et al. | |
| 2004/0121080 | A1 | 6/2004 | Urscheler et al. | |
| 2004/0166244 | A1 | 8/2004 | Ueberschar et al. | |
| 2004/0253385 | A1 | 12/2004 | Gueggi | |
| 2004/0265496 | A1 | 12/2004 | Gueggi et al. | |
| 2005/0025889 | A1 | 2/2005 | Yago | |
| 2005/0039871 | A1 | 2/2005 | Urscheler et al. | |
| 2005/0100677 | A1 | 5/2005 | Su et al. | |
| 2006/0005933 | A1 | 1/2006 | Okomori et al. | |
| 2006/0051528 | A1 | 3/2006 | Ogino et al. | |
| 2006/0137841 | A1 | 6/2006 | Chatani et al. | |
| 2006/0182893 | A1 | 8/2006 | Fermin et al. | |
| 2007/0231478 | A1 | 10/2007 | Watanabe et al. | |
| 2008/0096002 | A1 | 4/2008 | Leskela et al. | |
| 2008/0107912 | A1 | 5/2008 | Barcock | |

FOREIGN PATENT DOCUMENTS

| | | | |
|---|---|---|---|
| DE | 10057729 | A1 | 5/2002 |
| EP | 517223 | A1 | 12/1992 |
| EP | 0919395 | | 6/1999 |
| EP | 969147 | A2 | 1/2000 |
| EP | 1249533 | | 10/2002 |
| EP | 1319747 | | 6/2003 |
| EP | 1411168 | | 4/2004 |
| EP | 1416087 | | 5/2004 |
| EP | 1416088 | | 5/2004 |
| GB | 838392 | | 6/1960 |
| GB | 1509646 | A | 5/1978 |
| JP | 05-106198 | A | 4/1993 |
| JP | 1993-117996 | | 5/1993 |
| JP | 05-247890 | A | 9/1993 |
| JP | 06-346400 | A | 12/1994 |
| JP | 07-166493 | A | 6/1995 |
| JP | 07-300796 | A | 11/1995 |
| JP | 08-310110 | A | 11/1996 |
| JP | 11-192777 | | 5/1998 |
| JP | 10-328613 | A | 12/1998 |
| JP | 2000-45200 | | 2/2000 |
| JP | 2000-153214 | A | 6/2000 |
| JP | 2002274020 | | 3/2001 |
| JP | 2002294599 | | 3/2001 |
| JP | 2001-300386 | | 10/2001 |
| JP | 2005-120502 | | 5/2005 |
| WO | WO 92/11095 | | 7/1992 |
| WO | WO 98/45054 | | 10/1998 |
| WO | WO 01/54828 | | 8/2001 |
| WO | WO 02/053838 | | 7/2002 |
| WO | WO 02/066739 | | 8/2002 |
| WO | WO 02/081576 | | 10/2002 |
| WO | WO 02/084029 | | 10/2002 |
| WO | WO 2004/101691 | A2 | 11/2004 |
| WO | WO 2006/070065 | A1 | 7/2006 |

OTHER PUBLICATIONS

Triantafillopoulos, Nick, et al., "Operational Issues in High-Speed Curtain Coating of Paper," 2001 TAPPI Coating and Graphic Arts Conference and Trade Fair (May 6-9, 2001), pp. 251-263, San Diego, CA, USA.

Schweizer, Peter M., "Simultaneous Multilayer Coating Technologies: Attractiveness and Limitations," TAPPI Coating Conference 2002, (May 5-8, 2002), pp. 1-14, Orlando, FL, USA.

Urscheler, Robert, et al., "Key Attributes and Opportunities of Multilayer Curtain Coating for Paper," 2005 TAPPI Coating Conference and Exhibit, (Apr. 17-20, 2005) pp. 1-16 (including 23 pgs of slides).

Alleborn, Norbert, et al., "Anwendung der Vorhangbeschichtung zur Oberflachenveredelung von Bauelementen aus Beton," *Chemie lngenieur Technik*, 77, No. 1-2(2005), pp. 84-89.

MicroPatent Abstract: WO9847630A1; Meier, et al., Oct. 2, 1998.

Stephan F. Kistler and Peter M. Schweizer; *Liquid Film Coating Scientific Principles and Their Technological Implications*; Chapman & Hall; New York; 1997; Chapter 11; "Slot Coating"; pp. 401-536.

Stephan F. Kistler and Peter M. Schweizer; *Liquid Film Coating Scientific Principles and Their Technological Implications*; Chapman & Hall; New York; 1997; Chapter 15; "Control And Opitmization of Coating Processes"; pp. 735-768.

Alleborn, Norbert, et al., "Anwendung der Vorhangbeschich tung zur Oberflächenveredelung von Bauelementen aus Beton", Chemie lngenieur Technik, 2005, pp. 84-89, 77, No. 1-2.

K. H. Bergk; Derwent Abstract for DD 221722A, May 2, 1985, (East German Application No. 1984DD-0259266, Jan. 9, 1984).

Schweizer, Peter M., "Premetered coating processes, Advantages and applications", *Coating*, 1998.

Alleborn, Norbert et al., "High-speed curtain coating of paper", *PTS-Coating Symposium*, 2001.

Miyamoto, K. and Yoshinobu Katagiri, "Curtain Coating", *Liquid Film Coating*, 1997, 463-494.
Triantafillopoulos, Nick et al., "Operational Issues in High-speed Curtain Coating of Paper", 2001.
Derwent Abstract 1992-429056, Japanese patent 04-325586, Wakata Kazuyoshi et al., Nov. 13, 1992.
Derwent Abstract 1992-429948, Japanese patent 04-327296, Higuchi Masahiro et al., Nov. 16, 1992.
Derwent Abstract 1995-196793, Japanese patent 07-113068. Moroishi Yutaka et al., May 2, 1995.
Derwent Abstract 1999-063934, Japanese patent 10-309506, Kashiwada Hirotaka et al., Nov. 24, 1998.
Derwent Abstract 1992-170429, Japanese patent 04100998, Apr. 2, 1992.
Derwent Abstract 1993-055029, Japanese patent 05004441, Sugiyama Takeo, Jan. 14, 1993.
Derwent Abstract 1994-222740, Japanese patent 06158591, Jun. 7, 1994.
Derwent Abstract 1995-009867, Japanese patent 06294099, Arai Takao et al., Oct. 21, 1994.
Derwent Abstract 1995-204515, Japanese patent 07119083, May 9, 1995.
Derwent Abstract 2001-274380, Japanese patent 2001/018526, Jul. 7, 1999.
Derwent Abstract 2001-239141, Japanese patent 2001/038284, Yanagisawa Kenji et al., Jul. 30, 1999.
Derwent Abstract 2001-274380, Japanese patent 2001/138631, Maruyama et al., May 22, 2001.
Derwent Abstract 2002-003151, Japanese patent 2001/252612, Sunakawa Tomohide, Sep. 18, 2001.
Derwent Abstract 2002-044693, Japanese patent 2001/262499, Yamane Kengo, Sep. 26, 2001.
Derwent Abstract 2002-296627, Japanese patent 2001/293956, Shiraishi et al., Oct. 23, 2001.
Derwent Abstract 2003-357679, Japanese patent 2002/307804, Yokota Yasuro, Oct. 23, 2002.
Derwent Abstract 2003-516007, Japanese patent 2002/323734, Nagahama Masaru et al., Nov. 8, 2002.
Derwent Abstract 2000-642699, Japanese patent 2000/262962, Ishiguro Naoyuki, Sep. 26, 2000.
Derwent Abstract 2002-041276, International patent 200176884, Shiraishi et al., Oct. 18, 2001.
Derwent Abstract 2000-070810, Japanese patent 10241758, Sushi, Mar. 7, 2000.
Hamamoto, N et al., "Coating Method for Photographic Film or Paper, Magnetic Recording Tape, Etc.—Adjusting Ratio of Extension Viscosity and Sharing to Between 5 and 100", JP 9-029166, Derwent Abstract, Accession No. 1997-159802.
Schweizer, "Curtain Coating Technology Can Mean Big Benefits", Paper Film Foil Coverter, Mar. 2000 p. 102-107.
Tripathi, et al., "A statical study of process variables to optimize a high speed curatin coater—Part 1", Tappi Journal, Jan. 2009 p. 20-26.

* cited by examiner

PROCESS FOR MAKING MULTILAYER COATED PAPER OR PAPERBOARD

CROSS REFERENCE TO RELATED APPLICATIONS

This application is a continuation of U.S. application Ser. No. 10/257,172, filed Apr. 17, 2003 now U.S. Pat. No. 7,425,246 B2, which is a 371 of PCT/US02/12002 filed Apr. 12, 2002.

BACKGROUND OF THE INVENTION

This invention relates to a method of manufacturing coated paper and paperboard. In addition, the present invention relates to a method of manufacturing multilayer coated paper and paperboard for applications wherein functional coatings or additives, whether pigmented or non-pigmented, constitute one or more of the coating layers.

In the manufacturing of printing paper usually pigmented coating compositions having a considerably higher solid content and viscosity compared to photographic solutions or emulsions are applied, for example, by blade type, bar type or reverse-roll type coating methods at high line speeds of above 1000 m/min. Any or all of these methods are commonly employed to sequentially apply pigmented coatings to the moving paper or paperboard surface.

However, each of these application methods inherently carries with them their own set of problems that can result in an inferior coated surface quality. In the case of the blade type coating method, the lodgment of particles under the blade can result in streaks in the coating layer, which lowers the quality of the coated paper or paperboard. In addition, the high pressure that must be applied to the blade to achieve the desired coating weight places a very large stress on the substrate and can result in the breakage of the substrate web, resulting in lowered production efficiency. Moreover, since the pigmented coatings are highly abrasive, the blade must be replaced regularly in order to maintain the evenness of the coated surface. Also, the distribution of the coating on the surface of the paper or paperboard substrate is affected by the surface irregularities of the substrate. An uneven distribution of coating across the paper or paperboard surface can result in a dappled or mottled surface appearance that can lead to an inferior printing result.

The bar (rod) type coating method has a limitation of solids content and viscosity of the pigmented coating color that is to be applied. Pigmented coatings applied by the bar type coating method are typically lower in solids content and viscosity than are pigmented coating colors applied by the blade type method. Accordingly, for the bar type coating method it is not possible to freely change the amount of coating that can be applied to the surface of the paper or paperboard substrate. Undesirable reductions in the quality of the surface of the coated paper or paperboard can result when the parameters of coating solids content, viscosity and coat weight are imbalanced. Moreover, abrasion of the bar by the pigmented coatings requires that the bar be replaced at regular intervals in order to maintain the evenness of the coated surface.

The roll type coating method is a particularly complex process of applying pigmented coatings to paper and paperboard in that there is a narrow range of operating conditions related to substrate surface characteristics, substrate porosity, coating solids content and coating viscosity that must be observed for each operating speed and each desired coat weight to be achieved. An imbalance between these variables can lead to an uneven film-split pattern on the surface of the coated paper, which can lead to an inferior printing result, or the expulsion of small droplets of coating as the sheet exits the coating nip. These droplets, if re-deposited on the sheet surface, can lead to an inferior printing result. Moreover, the maximum amount of coating that can be applied to a paper or paperboard surface in one pass using the roll type coating method is typically less than that which can be applied in one pass by the blade or bar type coating methods. This coating weight limitation is especially pronounced at high coating speeds.

Furthermore, all these methods have in common, that the amount of coating liquid applied to a paper web that generally has an irregular surface with hills and valleys is different whether applied to a hill or a valley. Therefore coating thickness and thus ink reception properties will vary across the surface of the coated paper resulting in irregularities in the printed image. Despite their drawbacks these coating methods are still the dominant processes in the paper industry due to their economics especially because very high line speeds can be achieved.

The Japanese patent applications JP-94-89437, JP-93-311931, JP-93-177816, JP-93-131718, JP-92-298683, JP-92-51933, JP-91-298229, JP-90-217327, and JP-8-310110 and EP-A 517 223 disclose the use of curtain coating methods to apply one or more pigmented coating layers to a moving paper surface. More specifically, the prior art relates to:

(i) The curtain coating method being used to apply a single layer of pigmented coating to a basepaper substrate to produce a single-layer-pigmented coating of paper.

(ii) The curtain coating method being used to apply a single priming layer of pigmented coating to a basepaper substrate prior to the application of a single layer of pigmented topcoat applied by a blade type coating process. Thus a multilayer-pigmented coating of paper was achieved by sequential applications of pigmented coating.

(iii) The curtain coating method being used to apply a single topcoating layer of pigmented coating to a basepaper substrate that has previously been primed with a single layer of pigmented precoat that was applied by a blade or a metering roll type coating process. Thus a multilayer-pigmented coating of paper was achieved by sequential applications of pigmented coating.

(iv) The curtain coating method being used to apply two single layers of specialized pigmented coating to a basepaper substrate such that the single layers were applied in consecutive processes. Thus a multilayer-pigmented coating of paper was achieved by sequential applications of pigmented coating.

The use of a curtain coating method to apply a single layer of pigmented coating to the surface of a moving web of paper, as disclosed in the above discussed prior art, is stated to offer the opportunity to produce a superior quality coated paper surface compared to that coated by conventional means. However, the sequential application of single layers of pigmented coating using curtain coating techniques is constrained by the dynamics of the curtain coating process. Specifically, lightweight coating applications can only be made at coating speeds below those currently employed by conventional coating processes because at high coating speeds the curtain becomes unstable and an inferior coated surface results. Hence the conventional methods of producing multicoated papers and paperboards employ the blade, rod or roll metering processes. However, application of consecutive single layers of pigmented coatings to paper or paperboard at successive coating stations, whether by any of the above coating methods, remains a capital-intensive process due to the number of coating stations required, the amount of ancillary hardware required, for example, drive units, dryers, etc., and the space that is required to house the machinery.

Coated papers and paperboards that have received a coating that contains an additive designed to impart functional properties, such as barrier properties, printability properties, optical properties, for example, color, brightness, opacity, gloss etc., release properties, and adhesive properties are here described as functional products and their coatings may be referred to as functional coatings. The coating components that impart these properties may also be referred to as functional additives. Functional products include such types as self adhesive papers, stamp papers, wallpapers, silicone release papers, food packaging, grease-proof papers, moisture resistant papers, saturated tape backing papers.

The curtain coating method for the simultaneous coating of multiple layers is well known and is described in U.S. Pat. Nos. 3,508,947 and 3,632,374 for applying photographic compositions to paper and plastic web. But photographic solutions or emulsions have a low viscosity, a low solid content and are applied at low coating speeds.

In addition to photographic applications simultaneous application of multiple coatings by curtain coating methods is known from the art of making pressure sensitive copying paper. For example, U.S. Pat. No. 4,230,743 discloses in one embodiment simultaneous application of a base coating comprising microcapsules as main component and a second layer comprising a color developer as a main component onto a travelling web. But it is reported that the resulting paper has the same characteristics as the paper made by sequential application of the layers. Moreover, the coating composition containing the color developer is described as having a viscosity between 10 and 20 cps at 22° C.

JP-A-10-328613 discloses the simultaneous application of two coating layers onto a paper web by curtain coating to make an inkjet paper. The coating compositions applied according to the teaching of that reference are aqueous solutions with an extremely low solid content of about 8 percent by weight. Furthermore a thickener is added in order to obtain non-Newtonian behavior of the coating solutions. The examples in JP-A-10-328613 reveal that acceptable coating quality is only achieved at line speeds below 400 m/min. The low operation speed of the coating process is not suitable for an economic production of printing paper especially commodity printing paper.

It is taught in the art that a critical requirement for successful curtain coating at high speeds is that the kinetic energy of the falling curtain impacting the moving web be sufficiently high to displace the boundary layer air and wet the web to avoid air entrainment defects. This can be accomplished by raising the height of the curtain and/or by increasing the density of the coating. Hence, high speed curtain coating of low-density coatings, such as a functional or glossing coating containing synthetic polymer pigment for improved gloss, is taught to be difficult due to the lower kinetic energy of low-density materials, and due to the fact that increasing the height of the curtain is limited by the difficulty of maintaining a stable uniform curtain.

Although some improvements could be achieved by sequential coating steps using conventional coating techniques and/or curtain coating methods as discussed above, there is still a desire for further improvements with respect to printing quality of the resulting coated paper or paperboard and economics of the coating process.

SUMMARY OF THE INVENTION

In one embodiment, the invention is a process comprising forming a composite, multilayer free flowing curtain, the curtain having a solids content of at least 45 weight percent, and contacting the curtain with a continuous web substrate of basepaper or baseboard.

The invention also includes a process comprising: forming a composite, multilayer free-flowing curtain; and contacting the curtain with a continuous web substrate of base paper or paperboard, the web having a velocity of at least 1400 meters per minute.

The invention further includes a method of manufacturing multilayer coated papers and paperboards that are especially suitable for printing, packaging and labeling purposes, but excluding photographic papers and pressure sensitive copying papers, in which at least two liquid layers selected from aqueous emulsions or suspensions are formed into a composite, free-falling curtain and a continuous web of basepaper or baseboard is coated with the composite coating curtain.

In another embodiment, the invention includes a coating process comprising contacting a moving web of paper with a composite curtain coating having a solids content of at least 45 percent wherein the curtain has at least 2 component layers, wherein a first layer is oriented such that it comes into direct contact with the web, has a coat weight of from about 0.1 to about 60 $g/m^2$, and contains from about 0.2 to about 10 weight percent polyvinyl alcohol based on the total composition of the first layer, wherein at least one layer other than the first layer contains a pigment and a binder, and wherein a top layer optionally contains a glossing additive.

In yet another embodiment, the invention includes a paper or paperboard having at least two coating layers obtainable by a method according to any of the preceding methods or processes of the invention. In addition, the invention includes a coated printing paper wherein the coating has at least 3 layers and a total coat weight of at most 10 $g/m^2$.

DETAILED DESCRIPTION OF THE INVENTION

As used herein, the term "paper" also encompasses paperboard, unless such a construction is clearly not intended as will be clear from the context in which this term is used. The term "excluding photographic papers and pressure sensitive copying papers" should be interpreted in the sense that none of the layers of the curtain used in the practice of the present invention comprise silver compounds and that the layers do not contain a combination of a microcapsuled color former and a color developer in a single layer or in different layers.

The curtain layers can be simultaneously applied according to the present invention by using a curtain coating unit with a slide nozzle arrangement for delivering multiple liquid layers to form a continuous, multilayer curtain. Alternatively, an extrusion type supplying head, such as a slot die or nozzle, having several adjacent extrusion nozzles can be employed in the practice of the present invention.

According to a preferred embodiment of the present invention at least one of the curtain layers forming the composite free falling curtain is pigmented. Preferably, in making a paper for printing purposes at least two of the coating layers are pigmented. Additionally, a top layer for improving surface properties like gloss or smoothness that is not pigmented can be present. For the manufacturing of commodity printing paper, coating with two pigmented layers is sufficient for most purposes.

The present inventors have surprisingly discovered that the multilayer coated paper or paperboard that has at least two layers of pigmented coating applied simultaneously to the surface has superior coated surface printing properties compared to multilayer coated papers or paperboards manufactured by conventional coating methods such as blade, bar, roll or single-layer curtain coating methods as taught in the prior art.

The coating curtain of the present invention includes at least 2, and preferably at least 3, layers. The layers of the curtain can include coating layers, interface layers, and functional layers. The curtain has a bottom, or interface, layer, a top layer, and optionally one or more internal layers. Each layer comprises a liquid emulsion, suspension, or solution.

The curtain preferably includes at least one coating layer. A coating layer preferably includes a pigment and a binder, and can be formulated to be the same or different than conventional paper coating formulations. The primary function of a coating layer is to cover the surface of the substrate paper as is well known in the paper-coating art. Conventional paper coating formulations, referred to in the industry as coating colors, can be employed as the coating layer. Examples of pigments useful in the process of the present invention include clay, kaolin, talc, calcium carbonate, titanium dioxide, satin white, synthetic polymer pigment, zinc oxide, barium sulphate, gypsum, silica, alumina trihydrate, mica, and diatomaceous earth. Kaolin, talc, calcium carbonate, titanium dioxide, satin white and synthetic polymer pigments, including hollow polymer pigments, are particularly preferred.

Binders useful in the practice of the present invention include, for example, styrene-butadiene latex, styrene-acrylate latex, styrene-butadiene-acrylonitrile latex, styrene-maleic anhydride latex, styrene-acrylate-maleic anhydride latex, polysaccharides, proteins, polyvinyl pyrrolidone, polyvinyl alcohol, polyvinyl acetate, cellulose and cellulose derivatives. Examples of preferred binders include carboxylated styrene-butadiene latex, carboxylated styrene-acrylate latex, carboxylated styrene-butadiene-acrylonitrile latex, carboxylated styrene-maleic anhydride latex, carboxylated polysaccharides, proteins, polyvinyl alcohol, and carboxylated polyvinyl acetate latex. Examples of polysaccharides include agar, sodium alginate, and starch, including modified starches such as thermally modified starch, carboxymethylated starch, hydroxyelthylated starch, and oxidized starch. Examples of proteins that can be suitably employed in the process of the present invention include albumin, soy protein, and casein.

The coat weight of a coating layer suitably is from 3 to 30 $g/m^2$, preferably from 5 to 20 $g/m^2$. The solids content of a coating layer suitably is at least 50 percent, based on the weight of that coating layer in the curtain, and preferably is from 60 to 75 percent. Preferably, a coating layer has a viscosity of up to 3,000 cps, more preferably 200 to 2,000 cps. Unless otherwise specified, references to viscosity herein refer to Brookfield viscosity measured at a spindle speed of 100 rpm at 25° C.

The interface layer is the layer that comes in contact with the substrate to be coated. One important function of the interface layer is to promote wetting of the substrate paper. The interface layer can have more than one function. For example, it may provide wetting and improved functional performance such as adhesion, sizing, stiffness or a combination of functions. This layer is preferably a relatively thin layer. The coat weight of the interface layer suitably is from 0.1 to 4 $g/m^2$, preferably from 1 to 3 $g/m^2$. The solids content of the interface layer suitably is from 0.1 to 65 percent, based on the weight of the interface layer in the curtain. In one embodiment, the interface layer is relatively low in solids, preferably having a solids content of from 0.1 to 40 percent. In another embodiment the interface layer is relatively high in solids, preferably having a solids content of from 45 to 65 percent. One way to implement an interface layer is to use a lower solids version of the main coating layer. The use of a lower solids version of the main layer has the advantage of having a minimal impact on the final coating properties. The viscosity of the interface layer is suitably at least 30 cps, is preferably at least 100 cps, is more preferably at least 200 cps, and even more preferably is from 230 cps to 2000 cps.

In a preferred embodiment of the invention, the interface layer includes one or more of the following: a dispersion such as a latex, including an alkali swellable latex; a blend of starch and poly(ethylene acrylic acid) copolymer; and the like; or a water soluble polymer, such as, for example, polyvinyl alcohol, a starch, an alkali soluble latex, a polyethylene oxide, or a polyacrylamide. Polyvinyl alcohol is a preferred component of the interface layer. The interface layer can optionally be pigmented, and this is preferred for certain applications.

The curtain of the invention can include one or more functional layers. The purpose of the functional layer is to impart a desired functionality to the coated paper. Functional layers can be selected to provide, for example, printability, barrier properties, such as moisture barrier, oil barrier, grease barrier and oxygen barrier properties, sheet stiffness, fold crack resistance, paper sizing properties, release properties, adhesive properties, and optical properties, such as, color, brightness, opacity, gloss, etc. Functional coatings that are very tacky in character would not normally be coated by conventional consecutive coating processes because of the tendency of the tacky coating material to adhere the substrate to guiding rolls or other coating equipment. The simultaneous multilayer method, on the other hand, allows such functional coatings to be placed underneath a topcoat that shields the functional coating from contact with the coating machinery.

The solids content of a functional layer can vary widely depending on the desired function. A functional layer of the present invention preferably has a solids content of up to 75 percent by weight based on the total weight of the functional layer and a viscosity of up to 3,000 cps, more preferably 50 to 2,000 cps. Preferably, the coat weight of a functional layer is from 0.1 to 10 $g/m^2$, more preferably 0.5 to 3 $g/m^2$. In certain situations, such as, for example, when a dye layer is employed, the coat weight of the functional layer can be less than 0.1 $g/m^2$.

The functional layer of the present invention can contain, for example, a polymer of ethylene acrylic acid, a polyethylene, a polyurethane, an epoxy resin, a polyester, other polyolefins, an adhesive such as a styrene butadiene latex, a styrene acrylate latex, a carboxylated latex, a starch, a protein, or the like, a sizing agent such as a starch, a styrene-acrylic copolymer, a styrene-maleic anhydride, a polyvinyl alcohol, a polyvinyl acetate, a carboxymethyl cellulose or the like, a barrier such as silicone, a wax or the like. The functional layer can include, but is not limited to include, a pigment or binder as previously described for the coating layer. If desired, one or more additives such as, for example, a dispersant, a lubricant, a water retention agent, a crosslinking agent, a surfactant, an optical brightening agent, a pigment dye or colorant, a thickening agent, a defoamer, an anti-foaming agent, a biocide, or a soluble dye or colorant or the like may be used in one or more layers of the curtain.

For the purposes of the present invention, the layer most distant from the substrate paper is referred to as the top layer. This layer typically is the layer that will be printed upon, although it is possible that the coated paper of the present invention could also be further coated using conventional means, such as rod, blade, roll, bar, or air knife coating techniques, and the like. The top layer can be a coating layer or a functional layer, including a gloss layer. In a preferred embodiment of the invention, the top layer is very thin, having a coat weight of, for example from 0.5 to 3 $g/m^2$. This advantageously allows the use of less expensive materials under the top layer, while still producing a paper having good printing properties. In one embodiment, the top layer is free of mineral pigment.

According to a particularly preferred embodiment the top layer comprises a glossing formulation. The novel combination of glossing formulation and simultaneous multilayer curtain coating combines the advantages of curtain coating with good gloss.

The glossing formulations useful in the present invention comprise gloss additives, such as synthetic polymer pigments, including hollow polymer pigments, produced by polymerization of, for example, styrene, acrylonitrile and/or acrylic monomers. The synthetic polymer pigments have a glass transition temperature of 40-200° C., more preferably 50-130° C., and a particle size of 0.02-10 μm, more preferably 0.05-2 μm. The glossing formulations contain 5-100 weight-percent, based on solids, of gloss additive, more preferably 60-100 weight-percent. Another type of glossing formulation comprises gloss varnishes, such as those based on epoxyacrylates, polyester, polyesteracrylates, polyurethanes, polyetheracrylates, oleoresins, nitrocellulose, polyamide, vinyl copolymers and various forms of polyacrylates. According to a preferred embodiment of the present invention the viscosity of the top layer is above 20 cps. A preferred viscosity range is from 90 cps to 2,000 cps, more preferred from 200 cps to 1,000 cps.

When the curtain has at least 3 layers, then it has at least one internal layer. The viscosity of the internal layer(s) is not critical, provided a stable curtain can be maintained. Preferably, at least one internal layer has a viscosity of at least 200 cps, and in the case of a curtain with at least 4 layers, at least 2 internal layers preferably have a viscosity of at least 200 cps. The internal layer preferably is a functional layer or a coating layer. When more than one internal layer is present, combinations of functional and coating layers can be employed. For example, the internal layers can comprise a combination of identical or different functional layers, a combination of identical or different coating layers, or a combination of coating and functional layers.

The interface layer, top layer and optional internal layer comprise the composite free falling curtain of the invention. The solids content of the composite curtain can range from 20 to 75 wt-percent based on the total weight of the curtain. According to a preferred embodiment, the solids content of at least one of the layers forming the composite free falling curtain is higher than 60 wt-percent based on the total weight of the coating layer. In one embodiment of the invention, the solids content of the composite curtain is at least 45 weight percent, more preferably at least 55 weight percent, and even more preferably at least 60 weight percent. While very thin layers can be employed in the composite curtain, the total solids content and coat weight of the curtain preferably are as specified in this paragraph. Contrary to the art of photographic papers or pressure sensitive copying papers the method of the present invention can be practiced with curtain layers having a viscosity in a wide range and a high solids content even at high coating speeds.

The process of the present invention advantageously makes it possible to vary the composition and relative thickness of the layers in the multilayer composite structure. The composition of the multiple layers can be identical or different depending on the grade of paper being produced. For example, a thin layer next to the basepaper designed for adhesion, with a thick internal layer designed to provide sheet bulk, and a very thin top layer designed for optimum printing can be combined in a multilayer curtain to provide a composite structure. In another embodiment, an internal layer designed specifically for enhanced hiding can be employed. Other embodiments of variable coat weight layers in a multilayer composite include a thin layer of less than 2 $g/m^2$ as at least one of the top, internal or bottom layers of the composite coating. Using the process of the invention, the substrate paper can be coated on one or both sides.

The process of the invention expands the limits of paper coating technology, and gives the coated paper producer unprecedented flexibility. For example, it is possible to prepare coated paper having individual curtain layer coat weights that are far below, or above, coat weights obtainable via conventional methods. It is possible with the process of the invention to prepare a curtain having a variety of very thin layers, and this will result in a paper having a coating of many very thin layers. A further advantage of the process of the invention is that each layer can be formulated to serve a specific purpose.

A particular advantage of the present invention is that, by the simultaneous application of at least two coating layers by curtain coating, very thin layers or in other words very low coat weights of the respective layers can be obtained even at very high application speeds. For example, the coat weight of the each layer in the composite curtain can be from 0.1 to 10 $g/m^2$, more preferably 0.5 to 3 $g/m^2$. The coat weight of each layer can be the same as the others, or can vary widely from the other layers; thus, many combinations are possible.

The process of the invention can produce paper having a wide range of coat weights. Preferably, the coat weight of the coating on the paper produced is from 3 to 60 $g/m^2$. In one embodiment of the invention, the total coat weight of the coating is less than 20 $g/m^2$, preferably less than 15 $g/m^2$, and more preferably less than 12 $g/m^2$.

In one embodiment of the present invention the coat weight of the top layer is lower than the coat weight of the layer contacting the basepaper or baseboard. Preferably, the coat weight of the top layer is less than 75 percent, more preferably less than 50 percent, of the coat weight of the layer contacting the basepaper or baseboard. Thus, a greater coating raw material efficiencies in the paper and paperboard coating operations is achieved. In another embodiment, the coat weight of the top layer is higher than the coat weight of the layer(s) below it. Unlike conventional coating processes, the simultaneous multilayer coating method of the present invention allows the use of much larger quantities of relatively inexpensive raw materials under an extremely thin top layer of more expensive raw materials without compromising the quality of the finished coated product. In addition, the method of the invention allows the preparation of papers that have never been produced before. For example, a tacky functional internal layer can be included in the curtain.

A further advantage of the invention is in the lightweight-coated (LWC) paper area. Conventional LWC coating methods are capable of applying a single coating layer of no less than about 5 $g/m^2$. The process of the present invention is capable of simultaneously applying multiple layers to paper while maintaining the low coat weights of an LWC paper. This offers the paper maker an unprecedented range of product possibilities, including, for example, the possibility of making a LWC paper having functional coating layers.

A pronounced advantage of the present invention irrespective of which embodiment is used is that the process of the present invention can be run at very high coating speeds that hitherto in the production of printing paper could only be achieved using blade, bar or roll application methods. Usual line speeds in the process of the invention are above 400 m/min, preferably, above 600 m/min, such as in a range of 600-3200 m/min, and more preferably at least 800 m/min, such as in a range of 800 to 2500 m/min. In one embodiment of the invention, the line speed, or speed of the moving substrate, is at least 1400 m/min, preferably at least 1500 m/min.

Low density coatings can be applied at high coating speeds with a curtain coating through the use of simultaneous multilayer coating in which a high-density layer is used in combination with the low-density layer. In addition, the simultaneous multilayer curtain coating process of the invention allows the use of coating layers specifically designed to promote wetting of the substrate or to promote leveling of high solids coatings to further increase the high-speed operational coating window for paper and paperboard.

A further advantage of the present invention is that a method of manufacturing a multi-coated paper is provided that does not require the same level of high capital investment, the same amount of ancillary hardware or the same amount of space as is currently required by conventional multilayer coating methods such as blade, bar, and roll processes.

FIG. 1 is an explanatory cross-sectional view of a curtain coating unit 1 with a slide nozzle arrangement 2 for delivering multiple streams 3 of curtain layer to form a continuous, multilayer curtain 4. When a dynamic equilibrium state is reached, the flow amount of the curtain layers flowing into the slide nozzle arrangement 2 is completely balanced with the flow amount flowing out of the slide nozzle arrangement. The free falling multilayer curtain 4 comes into contact with web 5 which is running continuously and thus the web 5 is coated with multiple layers of the respective curtain layers. The running direction of the web 5 is changed immediately before the coating area by means of a roller 6 to minimize the effect of air flow accompanying the fast moving web 5.

Figure 2:

FIG. 2 is a cross-sectional electron micrograph view of a simultaneous multilayer coated paper sample in which air bubbles are visible in the coating. The shape of these bubbles is circular and the location of the bubbles is confined to the bottom layer that is in contact with the paper substrate. This is an example of air entrainment which occurs when a thin air film is entrained between the substrate and impinging coating. This air film is unstable and breaks into small bubbles. When the bubble size and number become excessive, visible defects appear. Air entrainment is a major issue as coating speeds increase because it ultimately results in uncoated spots on the paper substrate.

Figure 3:
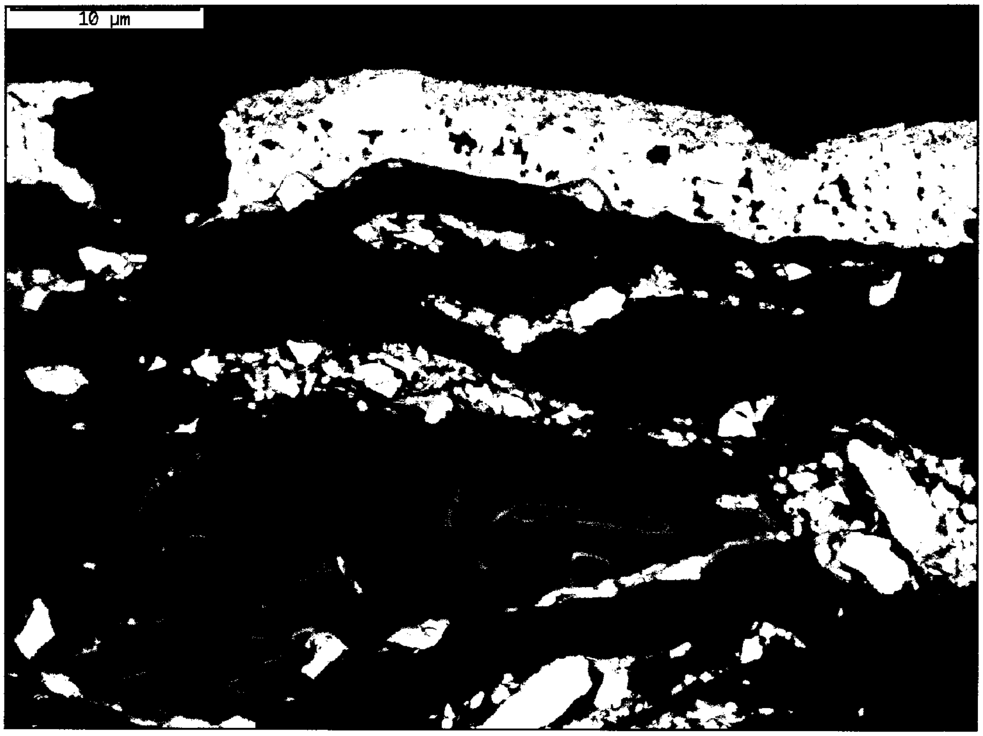

FIG. 3 is a cross-sectional electron micrograph view of a simultaneous multilayer coated paper sample that shows a coating defect caused by air entrainment. This type of coating defect will hereafter be referred to as "pitting." Pitting occurs when the size of the bubbles shown in FIG. 2 is sufficiently large to create an uncoated spot in the coating. On the paper surface the shapes of the pits are circular rather than elongated. This feature distinguishes pitting defects caused by air entrainment from defects caused from air bubbles in the coating that were not removed by deareation prior to coating.

Figure 4:
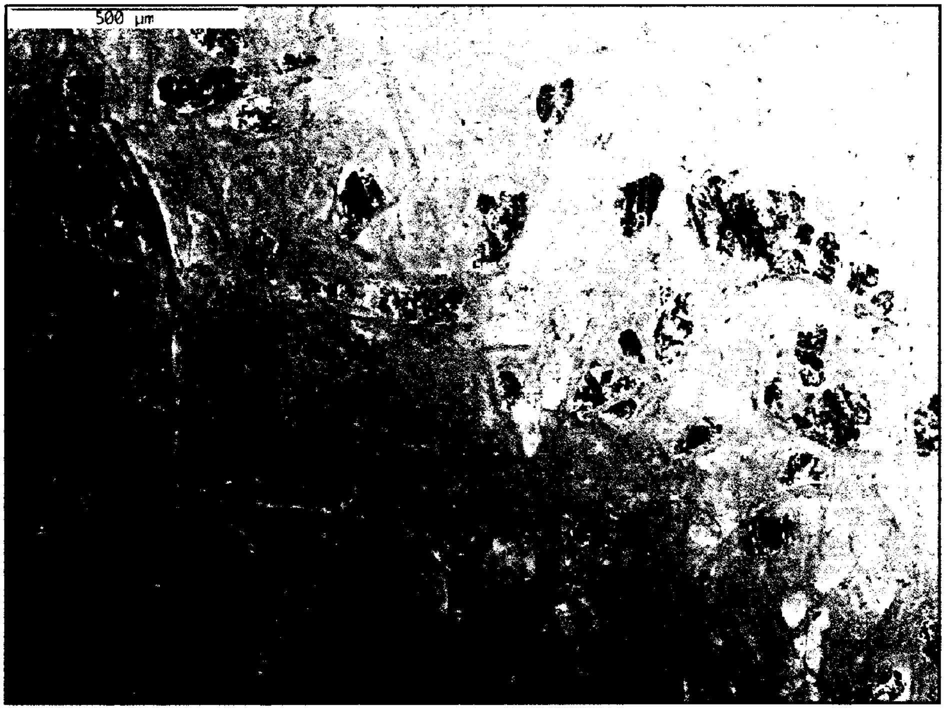

FIG. 4 is a surface electron micrograph view of a curtain coated paper sample that shows coating defects that hereafter will be defined as "cratering." Craters appear as irregular shaped areas of uncoated paper on the order of 0.1 mm or more in width. Craters are larger in scale than pitting defects and have irregular shapes compared to circular pits. Craters tend to appear in front of the protruding fibers and are oriented generally perpendicularly to the direction of motion of the paper during coating. In comparison, pitting occurs randomly across the sheet. Furthermore, in the case of simultaneous multilayer curtain coating any of the layers can be the source of cratering, whereas the source of pitting occurs in the layer adjacent to the basepaper. These observations indicate that cratering is a different phenomenon than pitting. The degree of crater formation was seen to increase exponentially above a critical coating speed. This critical speed varied depending upon the particular coating and basepaper. High levels of cratering lead to an unacceptable quality of coating. In severe cases of cratering, the uncoated areas can exceed 40% of the total surface area. Although cratering defects may appear to be a type of catastrophic air entrainment failure of the coating, the mechanism of crater formation behaves differently than classical air entrainment reported in the literature. Instead it appears that craters result from "micro-ruptures" at the uppermost part of the coating or at an interface between coating layers. Depending on the coating conditions these micro-ruptures can remain as micro-cracks in the dried coating or can grow to form larger ruptures resulting in craters having relatively large uncoated areas.

Figure 5:
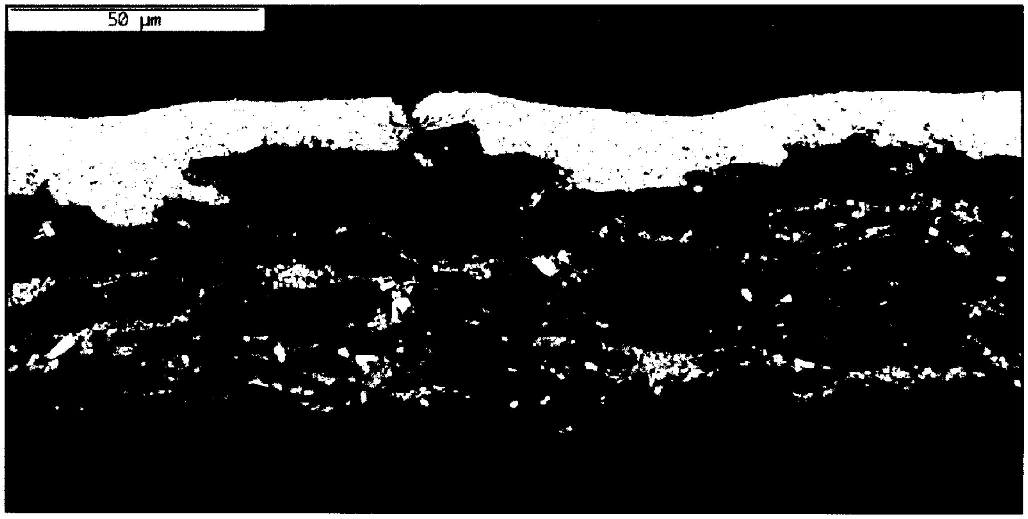

FIG. 5 is a cross-sectional electron micrograph view of a crater. The shape and size of the crater is different from that of a pit (shown in FIG. 3). Also illustrated in FIG. 5 is the presence of a protruding surface fiber at the front edge of the crater. Most craters occur adjacent to a protruding surface fiber and the degree of cratering is strongly influenced by the smoothness of the basepaper. Surprisingly, the uncoated regions of the crater appear in front of the protruding fibers rather than behind them.

Figure 6:

FIG. 6 is a cross-sectional electron micrograph view of a micro-crack in the coating. Similar to cratering, this defect is usually located next to a protruding fiber and is also usually oriented perpendicularly to the direction of motion of the paper during coating. It is believed that the mechanism for the formation of micro-cracks is the same as that for cratering.

FIG. 8 shows surface optical micrograph views of simultaneous multilayer coated paper on four different LWC basepapers. FIGS. 8A-D show coated Basepapers 1-4, respectively. The roughness values for these very different basepapers are given in Table 11. Basepapers 1-4 were coated at 1500 m/min under identical coating conditions and the details of the conditions are given in Example 30. FIG. 8 shows the good coverage and near crater-free coatings that can be made on these very different basepapers and demonstrates the robustness of the simultaneous multilayer curtain coating process.

Figure 7:
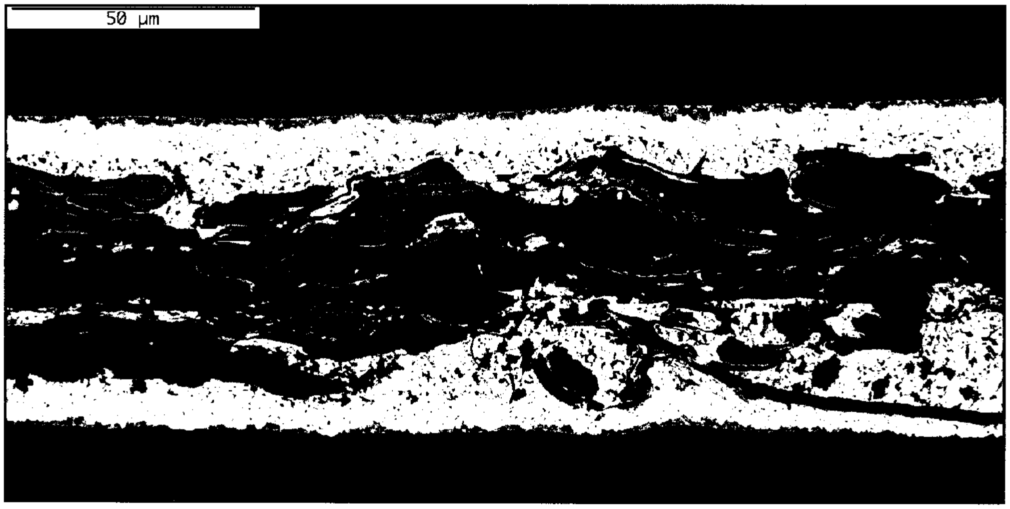
Figure 8A:
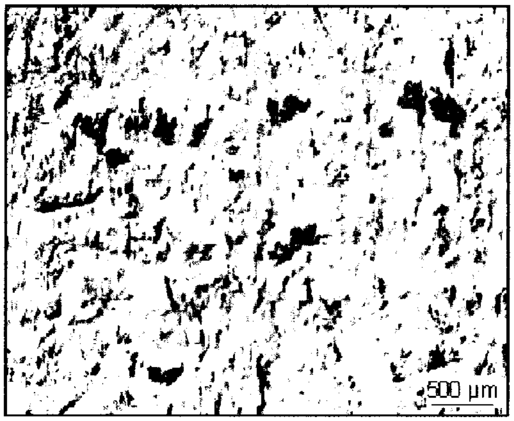
Figure 8B:
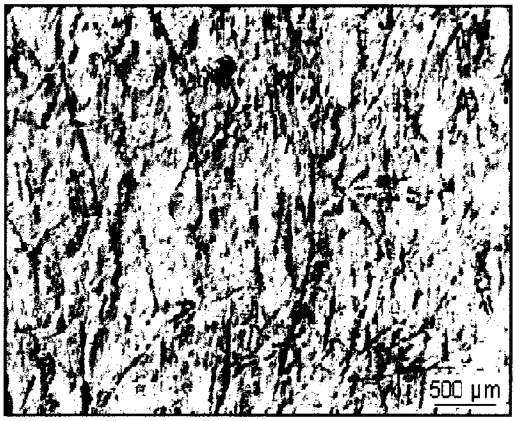
Figure 8C:
Figure 8D:

FIG. 7 is a cross-sectional electron micrograph view of a simultaneous multilayer coated paper sample that shows a uniform, thin top layer applied to a thicker bottom layer. This figure illustrates the capabilities of simultaneous multilayer curtain coating to apply very uniform thin layers on rough substrates at conventional paper coating speeds and solids. These capabilities of simultaneous multi-layer curtain coating are unmatched by any other current coating process. Even though the top layer in FIG. 7 is only on the order of 1 g/m$^2$ or only 10% of the total coating, this thin layer can dramatically change the gloss and printing characteristics of the coating. In addition these thin coating layers can be positioned anywhere in the coating and can be designed to impart specific functionality such as opacity, barrier, flexibility, stiffness, etc. to the coated paper making possible unprecedented combinations of coated paper properties.

The present invention will now be explained in more detail with reference to the examples.

SPECIFIC EMBODIMENTS OF THE INVENTION

All percentages and parts are based on weight unless otherwise indicated.

Test Methods

Brookfield Viscosity

The viscosity is measured using a Brookfield RVT viscometer (available from Brookfield Engineering Laboratories, Inc., Stoughton, Mass., USA). For viscosity determination, 600 ml of a sample are poured into a 1000 ml beaker and the viscosity is measured at 25° C. at a spindle speed of 20 and 100 rpm.

Degree of Cratering

The degree of cratering is determined by visual observation of burn out samples. A (50/50) water/isopropyl alcohol solution with 10% $NH_4Cl$ is used. Paper coated on only one side is immersed for 30 sec; double side coated paper stays 60 sec in this solution. After removing the excess of solution with a "blotting" paper the samples are air dried overnight. Burn out is done in an oven at 225° C. for 3 min and 30 sec. Craters are manually counted within a 3×3-cm section of the burn out samples with the help of magnifying glasses (magnification ×10). Very small uncoated spots, with perfect circular shape are not taken as craters; they are assumed to be pitting given by micro bubbles in the coating from air entrainment. Also not taken in account are elliptical uncoated areas oriented with the long axis in the machine direction (the direction in which the paper is moving) given by larger bubbles present in the coating formulation that are not removed by deaeration. The crater density gives only a number of craters per surface unit; the crater size is not taken into account in that number. Paper with a crater density of over 10 craters per $cm^2$ is unacceptable for printing purposes. For cases where crater density is not measured by counting, a relative scale of few, low, medium, high, and very high levels of cratering is used. Medium or higher levels of cratering are unacceptable for printing purposes.

Paper Gloss

Paper gloss is measured using a Zehntner ZLR-1050 instrument at an incident angle of 75°.

Ink Gloss

The test is carried out on a Pruefbau Test Printing unit with Lorrilleux Red Ink No. 8588. An amount of 0.8 $g/m^2$ (or 1.6 $g/m^2$ respectively) of ink is applied to coated paper test strips mounted on a long rubber-backed platen with a steel printing disk. The pressure of the ink application is 1,000 N and the speed is 1 m/s. The printed strips are dried for 12 hours at 20° C. at 55% minimum room humidity. The gloss is then measured on a Zehntner ZLR-1050 instrument at an incident angle of 75°.

Dry Pick Resistance (IGT)

This test measures the ability of the paper surface to accept the transfer of ink without picking. The test is carried out on an A2 type printability tester, commercially available from IGT Reprotest BV. Coated paper strips (4 mm×22 mm) are printed with inked aluminum disks at a printing pressure of 36 N with the pendulum drive system and the high viscosity test oil (red) from Reprotest BV. After the printing is completed, the distance where the coating begins to show picking is marked under a stereomicroscope. The marked distance is then transferred into the IGT velocity curve and the velocities in cm/s are read from the corresponding drive curve. High velocities mean high resistance to dry pick.

Wet Pick

The test is carried out on a Pruefbau Test Printing unit equipped with a wetting chamber. 500 $mm^3$ of printing ink (Hueber 1, 2, 3 or 4, depending on overall wet pick resistance of the paper) is distributed for 2 min on the distributor; after each print re-inking with 60 $mm^3$ of ink. A vulcanized rubber printing disk is inked by being placed on the distributor for 15 sec. Then, 10 $mm^3$ of distilled water is applied in the wetting chamber and distributed over a rubber roll. A coated paper strip is mounted on a rubber-backed platen and is printed with a printing pressure of 600N and a printing speed of 1 m/s. A central strip of coated paper is wetted with a test stripe of water as it passes through the wetting chamber. Printing is done on the same test strip immediately after coming out of the wetting chamber. Off print of the printing disk is done on a second coated paper test strip fixed on a rubber-backed platen; the printing pressure is 400N. Ink densities on both test strips are measured and used in the following formulas:

Ink transfer, defined as $X=(B/A)*100\%$

Ink refusal, defined as $Y=((100\times D-X*C)/100*A)*100\%$, and

Wet pick, defined as $Z=100-X-Y\%$; where

A is the ink density on non-wetted side stripes of first coated test strip,

B: is the ink density on wetted central stripe of first coated test strip,

C: is the ink density on side stripes for the off print done on the second strip, and D: is the ink density on central stripe for the off print done on the second strip.

Ink Piling

Ink piling is tested on a Pruefbau printability tester. Paper strips are printed with ink commercially available under the trade name Huber Wegschlagfarbe No. 520068. A starting amount of 500 $mm^3$ is applied to an ink distribution roll. A steel printing disk is inked to achieve an ink volume of 60 $mm^3$. A coated paper strip is mounted on a rubber-backed platen and printed with the inked steel disk at a speed of 1.5 m/s and a printing pressure of 800 N. After a 10-second delay time, the paper strip is re-printed using a vulcanized rubber printing disk also containing 60 $mm^3$ of ink and at a printing pressure of 800N. This procedure is repeated until the surface of the coated paper strip has ruptured. The number of printing passes required to rupture the coated paper surface is a measure of the surface strength of the paper.

Ink Mottling

This test is done to assess the degree of print irregularity. Paper strips are printed on the Pruefbau Test Printing unit with test ink commercially available under the trade designation Huber Wegschlagfarbe No. 520068. First, 250 $mm^3$ of ink is applied with a steel roll. Then, three passes using a vulcanized rubber roll follow and in each of those three passes an additional volume of 30 $mm^3$ of ink is applied. For evaluation of mottling, the strip is digitally analyzed using the Mottling Viewer Software from Only Solutions GmbH. First, the strip is scanned and the scan is converted to a gray scale. Then the deviation in gray scale intensity is measured at seven different resolutions with a width of 0.17 mm, 0.34 mm, 0.67 mm, 1.34 mm, 2.54 mm, 5.1 mm and 10.2 mm. From these measurements a mottle value (MV) is calculated. The result shows the degree of print irregularity. A higher number indicates a higher irregularity.

Paper Roughness

The roughness of the coated paper surface is measured with a Parker PrintSurf roughness tester. A sample sheet of coated paper is clamped between a cork-melinex platen and a measuring head at a clamping pressure of 1,000 kPa. Compressed air is supplied to the instrument at 400 kPa and the leakage of air between the measuring head and the coated paper surface is measured. A higher number indicates a higher degree of roughness of the coated paper surface.

Paper Stiffness

Paper stiffness is measured using the Kodak Stiffness method, TAPPI 535-PM-79.

Cobb Value

This test measures the water absorptiveness of paper and is conducted in accordance to the test procedure defined by the Technical Association of the Pulp and Paper Industry (T-441). A pre-conditioned and pre-weighed sample of paper measuring 12.5 cm×12.5 cm is clamped between a rubber mat and a circular metal ring. The metal ring is designed such that it circumscribes an area of 100 $cm^2$ on the paper sample surface. A 100-milliliter volume of de-ionized water is poured into the ring and the paper surface is allowed to absorb the water for a desired period of time. At the end of the time period the excess water is poured off, the paper sample removed, blotted and re-weighed. The amount of absorbed water is calculated and expressed as grams of water per square meter of paper. A higher number indicates a higher propensity for water absorption.

Emco Test

Tests are done on a Emco-DPM 27 apparatus (available from EMCO Elektronische Mess-und Steuerungstechnik GmbH, Mommsenstrasse 2, Leipzig, Germany). A paper sample (5 cm×7 cm) is fixed with a double-sided adhesive tape on the sample holder. The sample holder is fixed on an immersion appliance. The joined immersion appliance and sample holder device is released in order to allow it to plunge into the measurement cell, which is filled with distilled water held at 23° C. Ultrasound transmission measurement starts simultaneously upon immersion and continues over time. Water uptake by the paper is characterized by following, as a function of time, ultra-sound transmission through the paper sample immersed in water. A fraction of a second after immersion, a maximum of transmission is achieved, which correspond to complete wetting of the paper surface. By definition, this maximum is taken as 100% transmission. Penetration of water in the paper results in a decrease on ultra-sound transmission through the sample (Rayleigh-diffraction). The time needed for reaching 60% of the maximum ultra-sound transmission is taken as a characteristic of the water uptake of the sample. The lower the time the faster the water uptake.

Coat Weight

The coat weight achieved in each paper coating experiment is calculated from the known volumetric flow rate of the pump delivering the coating to the curtain coating head, the speed at which the continuous web of paper is moving under the curtain coating head, the density and percent solids of the curtain, and the width of the curtain.

Coating Density

The density of a curtain layer is determined by weighing a 100-milliliter sample of the coating in a pyknometer.

Formulations

The following materials were used in the coatings liquids:

Carbonate (A): dispersion of calcium carbonate with particle size of 60%<2 μm in water (Hydrocarb® 60 ME available from Pluess-Stauffer, Oftringen, Switzerland), 77% solids.

Carbonate (B): dispersion of calcium carbonate with particle size of 90%<2 μm in water (Hydrocarb® 90 ME available from Pluess-Stauffer), 77% solids.

Clay (A): dispersion of No. 2 high brightness kaolin clay with particle size of 80%<2 μm in water (SPS available from Imerys, St. Austell, England), 66.5% solids.

Clay (B): dispersion of No. 1 high brightness kaolin clay with particle size of 98%<2 μm in water (Hydragloss® 90 available from J.M Huber Corp., Have de Grace, Md., USA), 71% solids.

TiO2: dispersion of titanium dioxide-anatase type with specific surface, measured by oil uptake of 21 g oil/100 g pigment (Tiona® AT-1, available from Millenium Inorganic Chemicals S.A, Thann, France), 72% solids.

Talc: dispersion of talc with particle size distribution as follow: 96%<10 μm, 82%<5 μm, 46%<2μ (Finnatalc® C10 available from Mondo Minerals Oy, Helsinki, Finland), 65% solids.

Synthetic Polymer Pigment (A): dispersion of polystyrene with a volume average particle size of 0.26 μm (DPP 711 available from The Dow Chemical Company, Midland, Mich., USA), 52% solids in water.

Synthetic Polymer Pigment (B): anionic dispersion based on styrene/acrylate copolymer of a hollow particle with a nominal 1 μm average diameter and with a 55% void volume (Rhopaque® HP 1055, available from Rohm and Haas Deutschland GmbH, Frankfurt/Main, Deutschland) 26.5% solids in water.

Latex (A): carboxylated styrene-butadiene latex (DL 950 available from The Dow Chemical Company, Midland, Mich., USA), 50% solids in water.

Latex (B): carboxylated styrene-butadiene latex (DL 980 available from The Dow Chemical Company, Midland, Mich., USA), 50% solids in water.

Latex (C): styrene-acrylate latex (XZ 94329.04 available from The Dow Chemical Company, Midland, Mich., USA), 48% solids in water.

Latex (D): carboxylated styrene-butadiene latex (DL 966 available from The Dow Chemical Company, Midland, Mich., USA), 50% solids in water.

PU Dispersion: dispersion of polyurethane polymer (Syntegra® YA 500 available from The Dow Chemical Company, Midland, Mich., USA), 56% solids.

PE Dispersion: anionic dispersion of ethylene acrylic acid copolymer in water with minimum film formation temperature of 260° C. and Tg of 40° C. (Techseal® E-799/35, available from Trueb Chemie, Ramsen, Switzerland), 35% solids.

PVOH: solution of 15% of low molecular weight synthetic polyvinyl alcohol (Mowiol® June 1998 available from Clariant AG, Basel Switzerland)

Surfactant: aqueous solution of sodium di-alkylsulphosuccinate (Aerosol® OT available from Cyanamid, Wayne, N.J., USA), 75% solids.

Starch: thermally hydrolyzed modified corn starch, Bookfield Viscosity (100 rpm) of 25% solution at 40° C.=185 mPa·s (C-Film 07311 available from Cerestar, Krefeld, Germany).

Protein: modified, low molecular weight, anionic, soy protein polymer, with isoelectric pH of 4.3-4.5 (Procote® 5000, available from Dupont Soy Polymers, St Geyrac, France).

Whitener (A): fluorescent whitening (optical brightening) agent derived from diamino-stilbenedisulfonic acid (Blankophor® P available from Bayer AG, Leverkusen, Germany).

Whitener (B): fluorescent whitening agent derived from Diamino-stilbenedisulfonic acid (Tinepol® SPP, available from Ciba Specialty Chemicals Inc. Basel, Switzerland).

DSP: an anionic aqueous solution of styrene acrylate copolymer (Dow Sizing Polymer DSP 7, available from The Dow Chemical Company, Midland, Mich., USA) 15% solids.

The pH of the pigmented coatings formulations was adjusted to 8.5 by adding NaOH solution (10%). Water was added as needed to adjust the solids content of the formulations.

The above ingredients were mixed in the amounts given in Tables 1, 2, and 3 respectively to obtain bottom layer compositions (Formulations 1 to 17), top layer compositions (Formulations 18 to 41) and internal layer compositions (Formulations 42 to 49). All percentages and parts are based on weight unless otherwise indicated.

TABLE 1

Bottom Layer Formulations

| | Formulation | | | | | | | |
|---|---|---|---|---|---|---|---|---|
| | 1 | 2 | 3 | 4 | 5 | 6 | 7 | 8 |
| | Parts Based on Dry Weight | | | | | | | |
| Carbonate (A) | 100 | 100 | | | | | | 100 |
| Carbonate (B) | | | | 100 | 70 | 100 | 100 | |
| Clay (A) | | | | | 30 | | | |
| Clay (B) | | | | | | | | |
| Synthetic Polymer Pigment (A) | | | | | | | | |
| Latex (A) | 10 | 10 | | 10 | 10 | | | |
| Latex (B) | | | 100 | | | | | |
| Latex (C) | | | | | | | | 13 |
| Latex (D) | | | | | | 13 | 13 | |
| Starch | | | | | | | | |
| DSP | | | | | | | | 2.0 |
| PVOH | 1.2 | 1.0 | 1.0 | 1.0 | 1.0 | 1.0 | 2.0 | 0.4 |
| Surfactant | 0.5 | 0.4 | 0.8 | 0.4 | 0.4 | 0.4 | 0.4 | |
| Whitener (A) | | 1.5 | | 1.5 | | | | |
| Solids Content (%) | 72.7 | 71.1 | 49.2 | 69.7 | 61.7 | 60.9 | 59.9 | 52.0 |
| Coating Density | 1.70 | 1.66 | 1.03 | 1.64 | 1.53 | 1.51 | 1.49 | 1.41 |
| 20 rpm Viscosity (cps) | 870 | 440 | 1270 | 810 | 800 | 200 | 150 | 40 |
| 100 rpm Viscosity (cps) | 360 | 230 | 350 | 360 | 260 | 140 | 130 | 60 |
| pH | 8.5 | 8.5 | 8.5 | 8.5 | 8.5 | 8.7 | 8.7 | 8.8 |
| Layer Function | Coating (Precoat) | Coating (Precoat) | Interface Layer | Main Layer (Precoat) | Interface Layer | Interface Layer | Interface Layer | Interface Layer |
| Example Number Letters = Comparative Experiment | 1, A | 2, 3, 4, 5 | 6, 7 | 8, 9, 29 | 10, 11, 12 | 13, 23, 24, 25, 26, 27, 28, 30, 31, 32, 33, 34, 35, 36, 37, 39, 43, 44 | 14 | 15 |

| | Formulation | | | | | | | | |
|---|---|---|---|---|---|---|---|---|---|
| | 9 | 10 | 11 | 12 | 13 | 14 | 15 | 16 | 17 |
| Carbonate (A) | 100 | 100 | | | | | 80 | | 100 |
| Carbonate (B) | | | | | | | | | |
| Clay (A) | | | | | | | 20 | | |
| Clay (B) | | | | | | | | 100 | |
| Synthetic Polymer Pigment (A) | | | | | | | | | |
| Latex (A) | | | | | | | | | |
| Latex (B) | | | | | | | | | 10 |
| Latex (C) | 8 | 10 | | | | 100 | | 26 | |
| Latex (D) | 6 | 17 | | 100 | 100 | | | | |
| Starch | | | | | 10 | | | | |
| DSP | | | 100.0 | | | | 30.0 | 1.0 | 0.5 |
| PVOH | 0.4 | 0.4 | 0.4 | 0.91 | 0.4 | 0.4 | 0.4 | 0.2 | 0.4 |
| Surfactant | | | | | | | 1.0 | | |
| Whitener (A) | | | | | | | | | |
| Solids Content (%) | 59.9 | 39.9 | 10.0 | 18.5 | 21.9 | 47.5 | 29.5 | 50.4 | 72.5 |
| Coating Density | 1.52 | 1.26 | 1.01 | 1.05 | 1.09 | 1.02 | 1.19 | 1.04 | 1.70 |
| 20 rpm Viscosity (cps) | 170 | 20 | NM | NM | 240 | 1220 | 100 | 370 | 1750 |
| 100 rpm Viscosity (cps) | 130 | 30 | NM | NM | 260 | 540 | 140 | 150 | 570 |
| pH | 8.6 | 8.6 | NM | NM | 9.0 | 8.7 | 8.9 | 8.9 | 8.5 |
| Layer Function | Interface Layer | Interface Layer | Interface Layer | Interface Layer | Interface Layer | Interface Layer | Interface Layer | Interface Layer | Coating (Main Layer) |
| Example Number Letters = Comparative Experiment | 16 | 17 | 18 | 19 | 20 | 21 | 22 | 38 | 42 |

NM = Not Measured

TABLE 2

Top Layer Formulations

| | Formulation | | | | | | | | | | |
|---|---|---|---|---|---|---|---|---|---|---|---|
| | 18 | 19 | 20 | 21 | 22 | 23 | 24 | 25 | 26 | 27 | 28 |
| | Parts Based on Dry Weight | | | | | | | | | | |
| Carbonate (A) | | | | | | | | | | | |
| Carbonate (B) | 70 | 30 | 100 | | 70 | 70 | 70 | 70 | 70 | 70 | 70 |
| Clay (A) | 30 | | | | 30 | | | 30 | 30 | | 10 |
| Clay (B) | | 70 | | | | 30 | 30 | | | 30 | 20 |
| Talc | | | | | | | | | | | |
| Synthetic Polymer Pigment (A) | | | | 100 | | | | | | | |
| Synthetic Polymer Pigment (B) | | | | | | | | | | | |
| Latex (A) | 10 | | | | 10 | | | | | | |
| Latex (C) | | 11 | | | | | | | | | |
| Latex (D) | | | 10 | 26 | | 11 | 11 | 11 | 11 | 11 | 11 |
| PVOH | 0.3 | 0.7 | 1.0 | 1.0 | 1.0 | 1.0 | 2.5 | 1.0 | 2.5 | 2.5 | 2.5 |
| Protein | | | | | | | | | | | |
| Surfactant | 0.4 | 0.4 | 0.4 | 0.8 | 0.4 | 0.4 | 0.4 | 0.4 | 0.4 | 0.4 | 0.4 |
| Whitener (A) | | 1.5 | 1.5 | | | | | | | | |
| Solids Content (%) | 67.3 | 69.1 | 67.9 | 51.2 | 66.6 | 67.5 | 64.8 | 64.8 | 66 | 66.8 | 66.9 |
| Coating Density (g/cc) | 1.64 | 1.65 | 1.62 | 1.04 | 1.62 | 1.64 | 1.57 | 1.57 | 1.59 | 1.57 | 1.59 |
| 20 rpm Viscosity (cps) | 2400 | 1330 | 1450 | 540 | 3450 | 2620 | 2840 | 2840 | 3280 | 3530 | 4890 |
| 100 rpm Viscosity (cps) | 670 | 500 | 620 | 210 | 990 | 910 | 1000 | 1000 | 1140 | 1210 | 1670 |
| pH | 8.5 | 8.5 | 8.5 | 8.5 | 8.5 | 8.7 | 8.5 | 8.5 | 8.7 | 8.7 | 8.7 |
| Layer Function | Coating (Topcoat) | Coating (Topcoat) | Coating (Topcoat) | Functional Topcoat | Coating (Main Layer) | Coating (Main Layer) | Coating (Main Layer) | Coating (Main Layer) | Coating (Main Layer) | Coating (Main Layer) | Coating (Main Layer) |
| Example Number Letters = Comparative Experiment | 1, A, B | 2, 3, 4, 5 | 6, 7, C | 8, 9, 29 | 10, 11, 12, D | 13, 14, 15, 16, 17 | 18, 19, 20, 21, 22 | 23 | 24 | 25, 30, 31 | 26 |

| | Formulation | | | | | | | | | | | | |
|---|---|---|---|---|---|---|---|---|---|---|---|---|---|
| | 29 | 30 | 31 | 32 | 33 | 34 | 35 | 36 | 37 | 38 | 39 | 40 | 41 |
| Carbonate (A) | | | | | | | | | | | | 50 | |
| Carbonate (B) | 70 | 70 | 30 | 30 | 50 | 30 | 50 | 35 | | 80 | 100 | 50 | 50 |
| Clay (A) | 20 | 30 | | | | | | | | | | | |
| Clay (B) | 10 | | 70 | | | 55 | 15 | 65 | | 20 | | | 50 |
| Talc | | | | | | | 15 | | | | | | |
| Synthetic Polymer Pigment (A) | | | | 70 | | | | | 100 | | | | |
| Synthetic Polymer Pigment (B) | | | | | 50 | 15 | | | | | | | |
| Latex (A) | | | | 26 | 17 | | | | | | | 14 | 15 |
| Latex (C) | | | | | | | | | | | 10 | | |
| Latex (D) | 11 | 11 | 11 | | | 15 | 11 | 15 | 26 | 11 | | | |
| PVOH | 2.5 | 2.5 | 0.7 | 1.0 | 0.3 | 0.3 | 1.0 | 1.0 | 1.0 | 2.5 | 0.5 | 1.0 | 2.5 |
| Protein | | | | | | | | | | | | 3.0 | |
| Surfactant | 0.4 | 0.4 | 0.2 | 0.1 | 0.2 | 0.2 | 0.2 | 0.2 | 0.2 | 0.4 | 0.4 | 0.4 | 0.1 |
| Whitener (A) | | | 1.0 | 1.0 | 1.0 | 1.0 | | | | | | | 1.0 |
| Solids Content (%) | 66.6 | 66.5 | 60.1 | 50.4 | 42.6 | 57.1 | 60.5 | 60.4 | 50.4 | 66.3 | 72.5 | 58.9 | 60.3 |
| Coating Density (g/cc) | 1.60 | 1.57 | 1.51 | 1.13 | 1.15 | 1.51 | 1.52 | 1.49 | 1.04 | 1.59 | 1.70 | 1.48 | 1.46 |
| 20 rpm Viscosity (cps) | 5080 | 4940 | 670 | 70 | 160 | 1200 | 270 | 1160 | 370 | 4410 | 1750 | 2100 | 2380 |
| 100 rpm Viscosity (cps) | 1770 | 1540 | 240 | 90 | 110 | 390 | 160 | 390 | 150 | 1530 | 570 | 670 | 780 |
| pH | 8.7 | 8.7 | 8.6 | 8.8 | 8.8 | 8.6 | 8.7 | 8.5 | 8.9 | 8.8 | 8.5 | 8.1 | 8.6 |
| Layer Function | Coating (Main Layer) | Coating (Main Layer) | Functional Topcoat | Functional Topcoat | Functional Topcoat | Functional Topcoat | Functional Topcoat | Coating (Topcoat) | Functional Topcoat | Coating (Main Layer) | Coating (Main Layer) | Coating (Topcoat) | Coating (Topcoat) |
| Example Number Letters = Comparative Experiment | 27 | 28, 40, 41 | 32 | 33 | 34 | 35 | 36 | 37 | 38 | 39 | 42, E | 43 | 44 |

TABLE 3

Internal Layer Formulations

| | Formulation | | | | | | | |
|---|---|---|---|---|---|---|---|---|
| | 42 | 43 | 44 | 45 | 46 | 47 | 48 | 49 |
| | Parts Based on Dry Weight | | | | | | | |
| Carbonate (A) | 100 | | | | | | | |
| Carbonate (B) | | 60 | 70 | 55 | | | 100 | |
| Clay (B) | | 40 | 30 | 20 | | | | |
| TiO2 | | | | 25 | | | | |
| Latex (D) | 11 | 14 | 11 | 11 | | | 11 | |
| PE Dispersion | | | | | 100 | | | |
| PU Dispersion | | | | | | 88 | | |
| PVOH | 2.5 | 1.0 | 2.5 | 2.5 | | 2.0 | 2.5 | 100.0 |
| Surfactant | 0.4 | 0.4 | 0.4 | 0.4 | | | 0.1 | 0.4 |
| Whitener (A) | 1.0 | | | 1.0 | | | | |
| Whitener (B) | | | | | | | | 20 |
| CaCl2 (10%) | | 0.5 | | | | | | |
| Solids Content (%) | 70.2 | 63.6 | 66.8 | 59.8 | 34.2 | 55.2 | 69.9 | 9.8 |
| Coating Density | 1.67 | 1.57 | 1.57 | 1.54 | NM | 1.08 | 1.64 | 1.02 |
| 20 rpm Viscosity (cps) | 2050 | 5440 | 3530 | 1230 | NM | 2960 | 4300 | 55 |
| 100 rpm Viscosity (cps) | 900 | 1470 | 1210 | 460 | NM | 1060 | 1720 | 81 |
| pH | 8.7 | 8.5 | 8.7 | 8.8 | 8.0 | 7.8 | 8.8 | 8.6 |
| Layer Function | Coating (Main Layer) | Coating (Main Layer) | Coating (Main Layer) | Functional Internal Layer | Functional Internal Layer | Functional internal Layer | Coating (Main Layer) | Functional Internal Layer |
| Example Number | 32, 33, 34, 35, 36 | 37 | 38 | 39 | 40 | 41 | 43 | 44 |

NM = Not Measured

The formulations were coated onto paper according to the following procedure. A multilayer slide die type curtain coater manufactured by Troller Schweizer Engineering (TSE, Murgenthal, Switzerland) was used. The curtain coating apparatus was equipped with edge guides lubricated with a trickle of water and with a vacuum suction device to remove this edge lubrication water at the bottom of the edge guide just above the coated paper edge. In addition, the curtain coater was equipped with a vacuum suction device to remove interface surface air from the paper substrate upstream from the curtain impingement zone. The height of the curtain was 300 mm unless otherwise noted. Coating formulations were deaerated prior to use to remove air bubbles.

Example 1 and Comparative Experiments A, and B

To compare simultaneous multilayer curtain coating versus single-layer curtain coating, a woodfree basepaper (87 g/m$^2$, PPS roughness=5.6 μm) was coated at 900 m/min in three experiments in which the same total coat weight was applied in each of three ways, namely, consecutive single-layer coatings, simultaneous multilayer coating, and one single-layer coating application.

Comparative Experiment A

Bottom layer Formulation 1 was applied as a single-layer curtain to the topside of a moving, continuous web of the basepaper to achieve a coat weight of 10±0.2 g/m$^2$. The basepaper web was moving at 900 m/min. After drying, the undercoated paper was topcoated with top layer Formulation 18 as a single-layer curtain and dried to achieve a topcoat weight of 10±0.2 g/m$^2$.

Example 1

The same bottom layer and top layer formulations used in Comparative Experiment 1 were applied via simultaneous multilayer curtain coating to the topside of the basepaper such that each coating layer had a coat weight of 10±0.2 g/m$^2$. Drying was conducted using conditions as in Comparative Experiment A.

Comparative Experiment B

Top layer Formulation 18 was applied in a single-layer curtain application to the topside of the basepaper to achieve a coat weight of 20±0.2 g/m$^2$. Drying was achieved using similar drying conditions used in Comparative Experiment A.

The coated papers were all calendered under the same conditions and then tested for printing properties. Results from this series of trials are given in Table 4.

TABLE 4

| | Examples | | |
|---|---|---|---|
| | Comp. A | 1 | Comp. B |
| Bottom layer Formulation | 1 | 1 | — |
| Top layer Formulation | 18 | 18 | 18 |
| Web speed (m/min) | 900 | 900 | 900 |
| Undercoat Coat weight (g/m$^2$) | 9.9 | 10.2 | — |
| Topcoat Coat weight (g/m$^2$) | 10.0 | 10.0 | 19.9 |
| Single Layer Application | Yes | — | Yes |
| Multilayer Application | — | Yes | — |
| Paper Gloss (%) | 53 | 66 | 67 |
| Ink Gloss - 0.8 g/m$^2$ ink (%) | 73 | 89 | 85 |
| Ink Gloss - 1.6 g/m$^2$ ink (%) | 75 | 94 | 90 |
| Roughness (μm) | 4.4 | 1.7 | 2.0 |
| IGT Dry Pick (cm/s) | 91 | 95 | 80 |
| Ink Piling (No. of Passes) | 3 | 5 | 4 |
| Ink Mottling (Mottle Value) | 7.8 | 6.4 | 6.5 |

The results in Table 4 show that the simultaneous multilayer coated paper had superior paper gloss, ink gloss, roughness, dry pick resistance, ink piling and ink mottling compared to the paper that received consecutive single-layer curtain applications of undercoat and topcoat. Moreover, the simultaneous multilayer coated paper was superior in ink gloss, roughness, and dry pick resistance compared to the paper that received a single-layer curtain coating of 20 $g/m^2$ of the relatively more expensive topcoat. The same advantages would be expected for coating paperboard.

Examples 2 and 3

To determine whether a lightweight-coated (LWC) paper could be produced by simultaneous multilayer coating, a wood-containing basepaper (46 $g/m^2$, PPS roughness=7.9 μm) was coated in two trials such that the total coat weight applied was similar to that which could be applied in conventional single-layer blade or curtain coating processes. Coating speed was 800 m/min. The effect of increasing the relatively less expensive undercoat coat weight and decreasing the relatively more expensive topcoat coat weight on coated paper properties was examined by varying the ratio of undercoat coat weight to topcoat coat weight, but with the total coat weight remaining constant.

Example 2

Bottom layer Formulation 2 and top layer Formulation 19 were applied simultaneously to a continuous web of the basepaper such that each coating layer had a coat weight of 6.5±0.1 $g/m^2$. The coated paper was dried using similar drying conditions to those used in Example 1.

Example 3

Bottom layer Formulation 2 and top layer Formulation 19 were applied simultaneously to the basepaper such that the undercoat had a coat weight of 9.8 $g/m^2$ and the topcoat had a coat weight of 3.3 $g/m^2$. The coated paper was dried as in Example 2.

Coated papers from Example 2 and 3 were calendered under the same conditions and then tested for printing properties. Results from this series of trials are given in Table 5.

TABLE 5

| | Examples | |
|---|---|---|
| | 2 | 3 |
| Bottom layer Formulation | 2 | 2 |
| Top layer Formulation | 19 | 19 |
| Web speed (m/min) | 800 | 800 |
| Undercoat Coat weight ($g/m^2$) | 6.5 | 9.8 |
| Topcoat Coat weight ($g/m^2$) | 6.6 | 3.3 |
| Single layer Application | — | — |
| Multilayer Application | Yes | Yes |
| Paper Gloss (%) | 32 | 26 |
| Ink Gloss - 0.8 $g/m^2$ ink (%) | 45 | 35 |
| Ink Gloss - 1.6 $g/m^2$ ink (%) | 56 | 49 |
| Roughness (μm) | 4.2 | 4.4 |
| IGT Dry Pick (cm/s) | 47 | 58 |
| Ink Piling (No. of Passes) | 2 | 3 |
| Ink Mottling (Mottle Value) | 6.6 | 6.8 |

The results in Table 5 compare favorably with paper quality produced by other processes and are eminently suitable for printing purposes. Moreover, Example 3 demonstrates that acceptable coated paper properties were achieved by applying only half of the relatively expensive topcoat formulation applied in Example 2. The results further demonstrate that simultaneous multilayer coating enables the ratio of undercoat to topcoat to be varied significantly without impacting the speed at which the web is coated. Application of a 3.3 $g/m^2$ coat weight at 800 m/min, as demonstrated in Example 3, is not achievable by single-layer curtain coating.

Examples 4 and 5

This was a repeat of Examples 2 and 3 but using wood-free (87 $g/m^2$, PPS roughness=5.6 μm) basepaper, a coating speed of 400 m/min, and a higher total coat weight target such as is typically applied to double coated woodfree papers and to coated paperboards produced by conventional coating methods. The objective of this experiment was to determine whether simultaneous multilayer coating of a woodfree basepaper, in which a very low coat weight of a relatively expensive topcoat was applied to a very high coat weight of relatively less expensive undercoat, could produce acceptable paper properties for printing purposes.

Example 4

Bottom layer Formulation 2 and top layer Formulation 19 were applied simultaneously to the basepaper such that the undercoat had a coat weight of 18.6 $g/m^2$ and the topcoat had a coat weight of 6.8 $g/m^2$.

Example 5

Example 4 was repeated except that the undercoat had a coat weight of 21.7 $g/m^2$ and the topcoat had a coat weight of 3.5 $g/m^2$.

Coated papers from Examples 4 and 5 were dried and calendered under similar conditions and then tested for printing properties. Results from this series of trials are given in Table 6.

TABLE 6

| | Examples | |
|---|---|---|
| | 4 | 5 |
| Bottom layer Formulation | 2 | 2 |
| Top layer Formulation | 19 | 19 |
| Web speed (m/min) | 400 | 400 |
| Undercoat Coat weight ($g/m^2$) | 18.6 | 21.7 |
| Topcoat Coat weight ($g/m^2$) | 6.8 | 3.5 |
| Single layer Application | — | — |
| Multilayer Application | Yes | Yes |
| Paper Gloss (%) | 78 | 75 |
| Ink Gloss - 0.8 $g/m^2$ ink (%) | 94 | 90 |
| Ink Gloss - 1.6 $g/m^2$ ink (%) | 95 | 93 |
| Roughness (μm) | 1.2 | 1.5 |
| IGT Dry Pick (cm/s) | 71 | 75 |
| Ink Piling (No. of Passes) | 9 | 7 |
| Ink Mottling (Mottle Value) | 6.1 | 6.2 |

The results in Table 6 compare favorably with paper quality produced by other processes and the coated papers are eminently suitable for printing purposes, thus confirming the findings of Examples 2 and 3 in that the simultaneous multilayer coating method enables the application of very light, relatively expensive topcoats over very heavy, relatively less expensive undercoats. It is also considered possible that the undercoat could be divided between several sub-layers where additional slots on the coating head are available. Such an approach allows increased flexibility for designing and applying curtain layers with very specific properties. The same advantages would be expected for coating paperboard.

Examples 6 and 7 and Comparative Experiment C

To determine whether simultaneous multilayer coating could be used for applying a non-pigmented, functional coating that would otherwise not be possible to apply by conventional coating methods, an experiment was conducted in which a tacky undercoat with water-barrier properties was applied simultaneously with a pigmented topcoat to a woodfree basepaper (87 g/$m^2$, PPS roughness=5.6 μm). Coating speed was 800 m/min.

Example 6

Bottom layer Formulation 3 and top layer Formulation 20 were applied simultaneously to woodfree basepaper such that the undercoat had a coat weight of 4.0 g/$m^2$ and the topcoat had a coat weight of 10.1 g/$m^2$.

Example 7

Example 6 was repeated except that the undercoat had a coat weight of 3.9 g/$m^2$ and the topcoat had a coat weight of 7.5 g/$m^2$.

Comparative Experiment C

Formulation 20 was applied as a single curtain coating to woodfree basepaper such that the coating had a coat weight of 10.1 g/$m^2$.

Coated papers from Examples 6 and 7 and Comparative Experiment C were dried and calendered under similar conditions and then tested for printing properties. Results from this series of trials are given in Table 7.

TABLE 7

| | Examples | | |
|---|---|---|---|
| | 6 | 7 | Comp. C |
| Bottom layer Formulation | 3 | 3 | — |
| Top layer Formulation | 20 | 20 | 20 |
| Web speed (m/min) | 800 | 800 | 800 |
| Undercoat Coat weight (g/$m^2$) | 4.0 | 3.9 | — |
| Topcoat Coat weight (g/$m^2$) | 10.1 | 7.5 | 10.1 |
| Single layer Application | — | — | Yes |
| Multilayer Application | Yes | Yes | — |
| Paper Gloss (%) | 48 | 45 | 39 |
| Ink Gloss - 0.8 g/$m^2$ ink (%) | 76 | 72 | 59 |
| Ink Gloss - 1.6 g/$m^2$ ink (%) | 82 | 82 | 66 |
| Roughness (μm) | 2.7 | 2.7 | 3.4 |
| IGT Dry Pick (cm/s) | >110 | >110 | 98 |
| Ink Piling (No. of Passes) | 10 | 10 | 6 |
| Cobb Value (g $H_2O/m^2$) | 10.9 | 10.0 | 45.4 |

The results in Table 7 demonstrate the suitability of the simultaneous multilayer coating method for applying non-pigmented functional coatings to paper, such as a barrier coating, where such coatings could otherwise not be applied by conventional paper coating methods or by consecutive single-layer curtain coating methods. The results clearly show that the application of the tacky undercoat significantly improved the overall strength of the coated paper, as measured by IGT dry pick and ink piling, and significantly decreased the water absorptiveness of the coated paper, as measured by the Cobb test.

Examples 8 and 9

An experiment was conducted in which an undercoat formulation was topcoated with a very light, high-glossing topcoat formulation. The coat weight of the topcoat was significantly lower than that which can be done by conventional blade and single-layer curtain coating methods at the coating speed used. Coating speed was 800 m/min. The substrate was a wood-containing basepaper (66 g/$m^2$, PPS roughness=6.3 μm).

Example 8

Bottom layer Formulation 4 and top layer Formulation 21 were applied simultaneously to the basepaper (such that the undercoat had a coat weight of 10.0 g/$m^2$ and the topcoat had a coat weight of 1.4 g/$m^2$.

Example 9

Example 8 was repeated except that the topcoat had a coat weight of 0.7 g/$m^2$.

Coated papers from Example 8 and 9 were dried and calendered under similar conditions and then tested for printing properties. Results from this series of trials are given in Table 8.

TABLE 8

| | Examples | |
|---|---|---|
| | 8 | 9 |
| Bottom layer Formulation | 4 | 4 |
| Top layer Formulation | 21 | 21 |
| Web speed (m/min) | 800 | 800 |
| Undercoat Coat weight (g/$m^2$) | 10.0 | 10.0 |
| Topcoat Coat weight (g/$m^2$) | 1.4 | 0.7 |
| Single layer Application | — | — |
| Multilayer Application | Yes | Yes |
| Paper Gloss (%) | 73 | 70 |
| Ink Gloss - 0.8 g/$m^2$ ink (%) | 83 | 86 |
| Ink Gloss - 1.6 g/$m^2$ ink (%) | 89 | 90 |
| Roughness (μm) | 4.5 | 3.9 |
| IGT Dry Pick (cm/s) | 71 | 75 |
| Ink Piling (No. of Passes) | 2 | 2 |
| Ink Mottling (Mottle Value) | 6.6 | 7.4 |

The results from this experiment show that the application of an ultra-low coat weight of a high-glossing topcoat by the simultaneous multilayer coating method can prepare a coated paper having excellent paper gloss and ink gloss. Specifically, a topcoat coat weight of less than 1 g/$m^2$ can be applied to achieve the desired coated paper properties. Conventional coating methods and single-layer curtain coating are unable to apply such low coat weights at such high speeds. The same advantages would be expected for coating paperboard.

Examples 10, 11, 12 and Comparative Experiment D

Examples 1 to 9 were coated at speeds below 1000 m/min. As coating speeds were increased above 1000 m/min the degree of cratering greatly increased. The onset of severe cratering sets the speed limit for curtain coating of paper and paperboard. This series of examples compares a single-layer curtain coating with a simultaneous two-layer curtain coating having a thin interface layer as the bottom layer of the curtain. The top layer composition of the multilayer curtain has the same composition as the single-layer curtain coating. The interface layer composition was a lower-solids version of the top layer formulation. The interface layer coat weight was varied from 0.5 to 2 g/$m^2$. The coatings were applied to a woodfree basepaper (87 g/$m^2$, PPS roughness=5.6 μm). The coating speeds were 900, 1200 and 1500 m/min.

Comparative Experiment D

Formulation 22 was applied as a single-layer curtain coating such that the coating had a coat weight of 16.0 g/$m^2$.

Example 10

A simultaneous multilayer curtain having a bottom layer of 0.5 $g/m^2$ of Formulation 5 and a top layer of 15.6 $g/m^2$ of Formulation 22 was applied using the same conditions of Comparative Experiment D to achieve a coat weight of 16.1 $g/m^2$.

Example 11

A simultaneous multilayer curtain having a bottom layer of 1.0 $g/m^2$ of Formulation 5 and a top layer of 14.9 $g/m^2$ of Formulation 22 was applied using the same conditions of Comparative Experiment D to achieve a coat weight of 15.9 $g/m^2$.

Example 12

A simultaneous multilayer curtain having a bottom layer of 2.0 $g/m^2$ of Formulation 5 and a top layer of 14.1 $g/m^2$ of Formulation 22 was applied using the same conditions of Comparative Experiment D to achieve a coat weight of 16.1 $g/m^2$.

The cratering results for the different combinations of speed and interface layer coat weight for this series of trials are shown in Table 9.

TABLE 9

| | Example | | | |
|---|---|---|---|---|
| | Comp. D | 10 | 11 | 12 |
| Condition | Single Layer | Two Layer | Two Layer | Two Layer |
| Top Layer Formulation | 22 | 22 | 22 | 22 |
| Interface Layer Formulation | None | 5 | 5 | 5 |
| Undercoat Coat weight ($g/m^2$) | 0.0 | 0.5 | 1.0 | 2.0 |
| Topcoat Coat weight ($g/m^2$) | 16.0 | 15.6 | 14.9 | 14.1 |
| Web speed = 900 (m/min) | Medium amount of craters | Very few craters | No craters | No craters |
| Web speed = 1200 (m/min) | High amount of craters | Medium amount of craters | Very few craters | Very few craters |
| Web speed = 1500 (m/min) | High amount of craters | High amount of craters | Low amount of craters | Very few craters |

The use of an interface layer clearly reduces cratering and increases the speed for producing acceptable quality paper. A minimal amount of the interface layer is needed; 0.5 $g/m^2$ was insufficient under the conditions employed here, but interface layer coat weights of 2 $g/m^2$ give good results. The reduced degree of cratering at high coating speeds demonstrates an advantage of simultaneous multilayer curtain coating with an interface layer versus single-layer curtain coating.

Examples 13, 14, 15, 16, and 17

Examples 10, 11, and 12 used a lower solids version of the main coating layer as the interface layer. Examples 13-17 investigate the advantages of using an interface layer, having a different composition than the main layer, where the wetting and theological properties of the interface layer can be adjusted independently. In addition, the more expensive ingredients and special pigments used in the top layer to enhance printing properties do not need to be used in all layers. Since the interface layer functions as an undercoat in the dried coating its composition preferably should be as simple and economical as possible. Hence, a calcium carbonate pigment was selected as the only pigment for Examples 13, 14, 15, 16, and 17. For all of these examples Formulation 23 was used as the top coating layer with a coat weight of 8 $g/m^2$. For this series of examples only the composition of the interface layer was varied. The interface layer coat weight was 2 $g/m^2$. The simultaneous multilayer curtain coating was applied to a 42 $g/m^2$ wood-containing basepaper (PPS=7.8 μm) at coating speeds of 1200 and 1500 m/min.

Example 13

Formulation 6, which contained 1 part of PVOH, was used as the bottom interface layer and gave a crater density of 2 craters/$cm^2$ at 1200 m/min and 13 craters/$cm^2$ at 1500 m/min.

Example 14

Formulation 7, which contained 2 parts of PVOH, was used as the bottom interface layer and gave a crater density of 1 craters/$cm^2$ at 1200 m/min and 9 craters/$cm^2$ at 1500 m/min. The increase in PVOH level in the interface layer from 1 part in Example 13 to 2 parts in this example resulted in a modest improvement in crater density.

Example 15

Formulation 8, which contained 2 parts of PVOH and which was a lower solids version of Formulation 7, was used as the interface layer. The coat weight of the interface layer was 1.33 $g/m^2$. Unexpectedly, the reduced interface layer performed well in reducing cratering. Crater density was 1.5 craters/$cm^2$ at 1200 m/min and 3 craters/$cm^2$ at 1500 m/min.

Example 16

PVOH is a relatively high cost ingredient in paper coating formulations. The PVOH was replaced in this example with starch, which is commonly used as an inexpensive binder and thickener. The level of latex was also decreased in the coating formulation. Formulation 9 was used as the bottom interface layer and gave a crater density of 2 craters/$cm^2$ at 1200 m/min and 7 craters/$cm^2$ at 1500 m/min. Some incompatibility was seen between the two coating layers with a gel like deposit forming on the slot exit of the interface layer. The mottle value of the dried coating was also slightly higher than that for the coatings in Examples 13, 14 and 15 which had PVOH in the interface layer.

Example 17

Formulation 10 at 39.9% solids was used as the bottom interface layer. The interface layer coat weight was 0.8 $g/m^2$. The crater density at the reduced coat weight was 1.7 craters/$cm^2$ at 1200 m/min and 7.5 craters/$cm^2$ at 1500 m/min. This is excellent performance considering the thinness of the interface layer. The stability of the curtain itself, however, was not as good as with a thicker interface layer.

In conclusion, although the starch-containing pigmented coatings in Examples 16 and 17 gave satisfactory performance as interface layers, the PVOH containing interface layers in Examples 13, 14 and 15 offered a wider latitude in coating operation and were preferred over the starch-containing formulations.

Examples 18, 19, 20, 21 and 22

The function of the interface layer need not be limited to wetting. Interface layers can be designed to have a dual purpose, for example, to provide wetting and improved performance such as adhesion and stiffness.

Examples 18, 19, 20, and 21 used unpigmented interface layers consisting of pure latex, or polymers in solution. Example 22 used a pigmented coating with high binder content to improve adhesion. The same top layer formulation was used for all these examples and the top layer coat weight was kept constant at 8 $g/m^2$. The selected top layer, Formulation 24, had a low tendency to crater so that the observed differences in cratering can be attributed to the influence of the interface layer. Because the interface layer compositions had a range of solids content and were both pigmented and unpigmented, the interface layer thickness was fixed at a 2.5 μm wet film thickness rather than a fixed coat weight as in the earlier examples. The simultaneous multilayer curtain coatings were applied to a 42 $g/m^2$ wood-containing basepaper (PPS=7.8 μm) at a coating speed of 1200 and 1500 m/min.

Example 18

Formulation 11, a 10% solution of PVOH, was used as the bottom interface layer. With this formulation the curtain was stable with 1200 m/min, but the teapot effect starts to become important at 1500 m/min when the coating flow has to be increased to keep a constant coat weight. The crater density was 13 craters/$cm^2$ at 1200 m/min and 27 craters/$cm^2$ at 1500 m/min. This degree of cratering was unacceptably high. Moreover the craters are big in size. As expected, the coating had improved adhesion (higher IGT pick strength) and increased stiffness over the control coating (Formulation 6 as the interface layer (2 $g/m^2$) and Formulation 24 (8 $g/m^2$) as the top layer). The stiffness results were 0.311 mN*m for the control and 0.355 mN*m for the coating with PVOH interface layer.

Example 19

Formulation 12, an 18.5% solution of starch, was used as the bottom interface layer. The starch solution performed well as an interface layer. The curtain was stable with no teapot effect at 1200 m/min and a very slight teapot effect at 1500 m/min. The cratering density was 0.7 craters/$cm^2$ at 1200 m/min and 1.5 craters/cm at 1500 m/min. The starch solution resulted in a higher degree of pitting defects and also had more defects arising from air bubbles in the coating. This indicates that deareation of the starch solution may be more difficult to achieve. The coating properties for the starch interface layer showed an improvement in IGT strength (58 versus 42 for the control) and an improvement in stiffness (0.361 mN*m versus 0.311 mN*m for the control). The major drawback of using starch as the interface layer was the low paper gloss (75° gloss=42) and slow ink set off. Mottling also increased. The ink gloss remained high (75° gloss=66) so that the coating gave higher delta gloss. The use of a starch solution as the interface layer is potentially useful for making matte and dull paper coating grades.

Example 20

The method of Example 19 was repeated using Formulation 13, which contains a sizing polymer in addition to the starch solution. This example combines surface sizing with coating as a simultaneous multilayer coating. Currently these two coating operations in industrial practice are done separately in a sequential fashion. The addition of Dow Sizing Polymer to the starch solution helped to stabilize the curtain and reduced/eliminated the teapot effect seen in Example 19 at a coating speed of 1500 m/min. The degree of cratering was very low for Formulation 13, but the amount of pitting and air bubbles was higher than that seen for the starch solution alone in Example 19. The IGT and wet pick strength of the coating with Formulation 13 was significantly higher than that of Formulation 12 (98 versus 58 for IGT and 75 versus 60 for wet pick). The paper gloss, however, was reduced (750 gloss=32) while the ink gloss remained high (750 gloss=63). The stiffness was unchanged from that seen with Formulation 17 and the ink piling was worse. The Cobb water test to show the influence of the sizing polymer did not show any difference compared to the starch alone. In part, this result was attributed to the pitting present in the coating. With improvement in the deareation, and with reformulation of the coating to minimize pitting, there should be an improvement in the sizing properties of the sheet.

Example 21

Formulation 14 was used as the bottom interface layer. This all-latex interface layer gave excellent curtain stability with no teapot effects. The cratering density was 0.3 craters/$cm^2$ at 1200 m/min and 1.3 craters/$cm^2$ at 1500 m/min. The paper gloss was 66 while the ink gloss was 84. A further advantage was a better coating cohesion (IGT=95). Ink set off was quite slow, which could be a possible drawback. Compared to the other interface layers in Examples 18, 19, 20 and 21, the all-latex layer gave the best set of properties, but it was the most expensive one.

Example 22

Formulation 15, a high binder content pigmented coating using 30 parts of PVOH as the binder and no latex binder, was used as the bottom interface layer. The runnability of this formulation was very good. The curtain was stable with no teapot effect. The cratering density was quite low and the pitting density was low as well. The IGT strength was good (IGT=78) and the stiffness was 0.274 mN*m versus 0.228 mN*m for the control. The paper gloss was low (75° gloss=36) as was the ink gloss (75° gloss=58).

Surprisingly, it was found that the functional interface layers also influenced the printing and gloss properties of the top layer coating even though the bottom interface layer was relatively thin and was some distance away from the coating surface. Cross-sectional electron micrographs of the simultaneous multilayer coatings indicate that there was limited mixing of coating components from one layer to another so the mechanism for this behavior is not known.

Examples 23, 24, 25, 26, 27 and 28

As shown above, although the degree of cratering was reduced by the addition of an interface layer, the composition of the layers not in contact with the basepaper surface had a significant influence as well. In the case of two-layer simultaneous multilayer curtain coating cratering can still occur in the main layer (top layer) even if a sufficiently thick interface layer with good wetting and rheological properties is used. This means that the composition and rheology of the main coating layer has to be modified in addition to the interface layer. It was discovered that the use of a low molecular weight PVOH had a dramatic ability to reduce the degree of cratering, particularly as the coating speed increased and/or the basepaper roughness increased. It was also discovered that the type of pigment in the coating has a tremendous effect on the degree of cratering. Small changes in pigment type and level can result in big differences in the degree of cratering. For this series of examples the bottom interface layer composition was kept constant and the composition of the top layer of the simultaneous multi-layer curtain was varied. The bottom interface layer used Formulation 6, which is known from Example 13 above to have good anti-cratering behavior. The coat weight of the bottom interface layer was 2 $g/m^2$. The top layer coat weight was 8 $g/m^2$. The simultaneous multi-layer curtain was applied to a 41 $g/m^2$ wood-containing basepaper (PPS=6.3 μm).

Examples 23 and 24 demonstrate the impact of PVOH level in the coating top layer on the degree of cratering. Examples 25, 26, 27 and 28 compare the use of two different coating clays in the main coating top layer.

Example 23

Formulation 25, containing 1 part of PVOH, was used as the top layer and applied at coating speed of 1500 m/min. This formulation in the top coat gave a medium level of cratering at this speed.

Example 24

The method of Example 23 was repeated using Formulation 26, containing 2.5 parts of PVOH, as the top layer. Using this formulation as the top layer resulted in a near crater-free coating at 1500 m/min. Increasing the PVOH level in the top layer dramatically reduced the degree of cratering.

Example 25

Formulation 27, containing 30 parts of Clay (B), was used as the top layer and was applied at 1200 and 1500 m/min. Cratering densities were 5.8 craters/$cm^2$ at 1200 m/min and 34 craters/$cm^2$ at 1500 m/min

Example 26

The method of Example 25 was repeated using Formulation 28 as the top layer. Formulation 28 has 10 parts of Clay (A) and 20 parts Clay (B). Cratering densities were 16 craters/$cm^2$ at 1200 m/min and 76 craters/$cm^2$ at 1500 m/min.

Example 27

The method of Example 25 was repeated using Formulation 29 as the top layer. Formulation 29 has 20 parts Clay (A) clay and 10 parts Clay (B). Cratering densities were 34 craters/$cm^2$ at 1200 m/min and 500 craters/$cm^2$ at 1500 m/min.

Example 28

The method of Example 25 was repeated using Formulation 30 as the top layer. Formulation 30 has 30 parts Clay (A). Cratering densities were 34 craters/$cm^2$ at 1200 m/min, 550 craters/$cm^2$ at 1500 m/min.

It is evident from Examples 25, 26, 27 and 28 that small changes in pigment composition (as little as 10 parts) can dramatically impact the degree of cratering.

Examples 29 and 30

Basepaper quality is known to influence the coating process. Basepaper roughness is recognized in the art as a key factor influencing the quality of coating. Examples 29 and 30 use a variety of base papers, both wood free and wood containing paper, coated and uncoated paper, and calendered and uncalendered paper, that have a range of surface roughness and chemistry.

Example 29

The method of Example 8 was repeated except that the bottom layer coat weight was 12 $g/m^2$ and the top layer coat weight was 1 $g/m^2$. The simultaneous two-layer curtain coating was applied to four different basepapers at coating speeds of 1200 and 1500 m/min. The details on the basepapers and cratering results are shown in Table 10.

TABLE 10

| | Total Weight | Precoat Weight | PPS Roughness | Degree of Cratering |
|---|---|---|---|---|
| Pigmented Wood-free Basepaper | 87 $g/m^2$ | 3 $g/m^2$ pigmented (bill blade) | 7.31 μm | Medium at 1200 m/min<br>High at 1500 m/min |
| Pigmented Wood-free Basepaper + precoat | 107 $g/m^2$ | 10 $g/m^2$ precoat bent blade + 3 $g/m^2$ pigmented | 5.61 μm | Very low at 1200 m/min<br>Low at 1500 m/min |
| Wood-containing Basepaper | 54 $g/m^2$ | none | 6.33 μm | Low at 1200 m/min<br>Medium at 1500 m/min |
| Wood-containing Basepaper + precoated + soft nip calendering | 66 $g/m^2$ | 6.2 $g/m^2$ stiff blade | 2.87 μm | Crater free at 1200 and 1500 m/min |

For non-precoated wood-free basepaper, coverage was bad at a coating speed of 1200 m/min and became even worse at 1500 m/min speed. On the precoated wood-free paper, at coating speeds of 1200 and 1500 m/min, good coverage was obtained with few craters. For the precoated+precalendered wood-containing basepaper the simultaneous multilayer-applied coating was crater free. A maximal PPS roughness for low crater density was about 6.3 μm. At PPS roughness=2.9 μm, a crater free coating was obtained. In the absence of an interface layer, a precoated basepaper was needed for low crater density at 1500 m/min for two-layer curtain coating with a thin functional toplayer. This limitation can be addressed by the addition of an interface layer to form a triple-layer simultaneous curtain coating.

Example 30

This example demonstrates the ability to make high-solids high-speed LWC coatings on a variety of basepapers by using the combination of an interface layer, having good wetting and anti-cratering properties, with a toplayer formulated to minimize cratering. Four different wood-containing basepapers representative of current LWC basepapers were made into a composite roll which could then be coated under identical coating conditions. These basepapers were not precalendered or precoated to prepare the surfaces for high-speed curtain coating.

The various basepapers were coated at 10 g/m$^2$ total coat weight using 2 g/m$^2$ of Formulation 6 as the interface layer and 8 g/m$^2$ of Formulation 27 as the top layer. The simultaneous two-layer curtain coating was applied to the composite basepaper roll at 1500 m/min. The curtain height was also varied. The results are summarized in Table 11.

TABLE 11

| Condition | PPS Roughness μm | Curtain height = 150 mm Coat weight = 10 g/m$^2$ | Curtain height = 300 mm Coat weight = 10 g/m$^2$ |
|---|---|---|---|
| Basepaper 1 | 8.0 | 5.2 craters/cm$^2$ | 4.0 craters/cm$^2$ |
| Basepaper 2 | 6.3 | 1.2 craters/cm$^2$ | 1.0 craters/cm$^2$ |
| Basepaper 3 | 5.9 | 0.6 craters/cm$^2$ | 0.4 craters/cm$^2$ |
| Basepaper 4 | 4.8 | 0.25 craters/cm$^2$ | 0.07 craters/cm$^2$ |

Surprisingly, this data shows it was possible to successfully coat at 1500 n/min on rough basepapers with a curtain height of only 150 mm.

FIG. 7 shows the good coverage and near crater-free coatings that can be made on these very different basepapers under identical coating conditions. This example illustrates the flexibility of simultaneous multilayer curtain coating since, unexpectedly, all the basepapers were coated without having to adjust the coating machine parameters.

Example 31

The method of Example 30 was repeated on Basepaper 3 at 1500 m/min in order to check the influence of air removal from the basepaper and air shielding of the curtain on the degree of cratering.

TABLE 12

| Air Shielding (Behind Curtain) | Air Removal (Pump Settings - Rpm) | Craters Per cm$^2$ | Curtain Stability |
|---|---|---|---|
| on | high (2150 rpm) | 3.7 | Stable |
| off | high (2150 rpm) | 3.6 | Stable |
| off | reduced (1600 rpm) | 5 | Severe fluttering |
| off | high (2150 rpm) | 8 | Stable |

Surprisingly, the removal of the air shielding and reduction of vacuum suction on the air removal device had no significant effect on crater density as shown in Table 12. This result indicates that the cratering seen during high-speed curtain coating of paper is different than the classical air entrainment reported in the literature because one would expect to see an increase in the crater density due to the boundary layer of air on the basepaper at such a high speed. These results further illustrate the advantages of using the coating formulations of the invention to achieve coatings with low crater densities with a wide coatability window of operation.

Examples 32-41

Even more flexibility in designing the coating is possible when three or more layers are applied simultaneously. For one- and two-layer coatings all of the coating layers are in contact with the air interface which places certain restrictions on the viscosity and dynamic surface tension properties of the coating layers. By forming a sandwich structure with a suitable interface layer and top layer it is possible to coat many types of coating layers which could not be coated alone. In addition, because of the thinness of the layers which can be applied using simultaneous multilayer curtain coating, it now becomes possible to design multilayer LWC coatings. This has not been possible in the past due to the limits on the lowest coat weights that could be applied via blade, rod, and film coating methods. Examples 32 to 41 show many types of multilayer LWC coatings (10 g/m$^2$ or less) which are possible using simultaneous multilayer curtain coating.

Examples 32, 33, 34, and 35

One embodiment of the invention for multilayer LWC coating is to use a thin interface layer combined with a relatively thick internal layer having good bulk and low cost, and using a thin functional top layer to get good sheet surface and printing properties. In this example 2 g/m$^2$ of Formulation 6 was used as the interface layer with 5-7 g/m$^2$ of Formulation 42 as the internal layer. For the top layer, 1-3 g/m$^2$ of four different functional top layers are used. The three layers were combined to form a simultaneous three-layer curtain and were applied to a wood-containing basepaper (40 g/m$^2$, PPS=5.3 μm) at 1200 m/min. Some key properties are shown in Table 13.

Example 32

Formulation 31 was used as the top layer and gave a low degree of cratering under all coating conditions.

Example 33

Formulation 32 was used as the top layer and gave a low degree of cratering under all coating conditions.

Example 34

Formulation 33 was used as the top layer and gave a low degree of cratering under all coating conditions.

Example 35

Formulation 34 was used the as top layer and gave a low degree of cratering under all coating conditions.

TABLE 13

| | | Int. Layer Coat weight | | |
|---|---|---|---|---|
| | | 7 | 6 | 5 |
| | | Top Layer Coat weight | | |
| | | 1 | 2 | 3 |
| Example 32 | Sheet Gloss. | No data | 36 | 40 |
| | Ink Set Off | No data | 0.58 | 0.37 |
| Example 33 | Sheet Gloss. | 26 | 32 | No data |
| | Ink Set Off | 2.85 | 3.12 | No data |
| Example 34 | Sheet Gloss. | 43 | 64 | No data |
| | Ink Set Off | 2.67 | 2.76 | No data |
| Example 35 | Sheet Gloss. | No data | 39 | 54 |
| | Ink Set Off | No data | 1.53 | 1.39 |

The term “no data” in this table indicates that the given experiment was not conducted.

The coated paper properties of the triple layer LWC coatings exhibit a wide range of performance. Each tested composition has a characteristic fingerprint in terms of paper gloss, delta gloss, ink set off speed balance. Table 14 summarizes some trends in the data obtained for Examples 32-35.

TABLE 14

| | Example 32 | Example 33 | Example 34 | Example 35 |
|---|---|---|---|---|
| Paper gloss | Lower | Lower | highest | medium |
| Ink gloss | Lower | High | highest | high |
| Ink set off | Fastest | Slow | slow | slow |
| Mottling | low | Medium | medium | low |
| Raw material cost | Lowest | High | high | medium |

The conclusion from this example is that, due to the ability to uniformly apply a layer as thin as 1 g/m$^2$, a very broad range of paper and printability characteristics can be obtained by changing only the composition of this top layer. This offers opportunities for the paper industry to develop tailor-made papers better adapted for specific printing conditions.

Example 36

The method of Example 33 was repeated to make a matte type rotogravure paper using Formulation 35 as the top layer. Formulation 35 contained a high level of talc pigment that is often used in making rotogravure paper. The top layer was applied at 1, 2 and 3 g/m$^2$ coat weights and the internal layer coat weight (Formulation 42) was decreased to keep the total coat weight constant. With top layer coat weight of 3 g/m a very homogeneous coating with a very low level of cratering could be made. Compared with a conventional rotogravure paper, the triple-layer curtain coated paper had improved fiber coverage with a more homogeneous surface appearance. In addition, the use of Formulation 42 as the internal layer gave higher brightness and lower overall cost compared to a coating using clay and talc throughout the entire coating thickness rather than in only a thin top layer.

Example 37

Simultaneous multilayer curtain coating provides a method of applying coatings that have rheology that makes it difficult, if not impossible, to apply them by other coating techniques. In this example a coating that was partially flocculated by adding calcium chloride solution was used as the internal layer of a three-layer curtain coating. The three-layer curtain consisted of 2 g/m$^2$ of Formulation 6 as the bottom layer, 15 g/m$^2$ of Formulation 43 as the internal layer, and 5 g/m$^2$ of Formulation 36 as the top layer. The coating was applied to a wood-free basepaper (76 g/m$^2$, PPS=5.3 μm) at 1000 m/min. The internal layer coating (Formulation 43) exhibits shear thickening behavior and cannot be coated by blade coating methods, nor does it form a stable curtain when used alone. By incorporating the flocculated coating into a multilayer curtain it was possible to form a stable curtain and have a very low crater density on the coated paper (0.54 craters/cm$^2$).

Example 38

It is possible to use the same functional coating as the bottom interface layer and as the top layer of the coating. In this example a three-layer curtain was formed by combining 2 g/m$^2$ of Formulation 16 as the bottom layer, 6 g/m$^2$ of Formulation 44 as the internal layer, and 2 g/m$^2$ of Formulation 37 as the top layer. Formulation 16 and Formulation 37 had the same composition, and contained plastic pigment. It was unexpectedly found that using the same composition for the top and bottom layers resulted in a very stable curtain and surprisingly eliminated teapot effects at high flow rates of the coating. This three-layer curtain was applied onto a wood-containing basepaper (41 g/m$^2$, PPS=7.1 μm) at 1500 m/min. The crater density was 7.4 craters/cm$^2$. Using the functional glossing coating with plastic pigment as the interface layer as well as the top layer gave an improvement in gloss of about 5-6 points.

Example 39

With a simultaneous multilayer coating incorporating thin layers it is possible to segregate the coating components and to design coating layers to provide a specific functionality such as stiffness, opacity, brightness, barrier, etc. In Example 39 all of the $TiO_2$ pigment in the coating was segregated into a thin internal layer of the multilayer coating. A three-layer curtain was formed by combining 2 g/m$^2$ of Formulation 6 as the bottom layer, 2 g/m$^2$ of Formulation 45 as the internal layer, and 6 g/m$^2$ of Formulation 38 as the top layer. The simultaneous three-layer coating was applied to wood-containing basepaper (40.5 g/m$^2$, PPS=7.9 μm) at 1000 m/min.

Examples 40 and 41

The capability of applying very uniform thin coating layers makes simultaneous multilayer curtain coating particularly suited for making pinhole-free barrier layers. In Examples 40 and 41 aqueous dispersions are used as thin layers in the middle of a multilayer coating to give barrier properties to the resulting coatings.

Example 40

In this example the bottom layer and top layer of the multilayer coating have the same composition and coat weight. The internal layer coat weight varied between 0, 2 and 3 g/m$^2$. Thus the multilayer curtain consists of 6 g/m$^2$ of Formulation 30 as the bottom layer; 0, 2 or 3 g/m$^2$ of Formulation 46 as the internal layer, and 6 g/m$^2$ of Formulation 30 as the top layer. The coating was applied to a wood-free basepaper (76 g/m$^2$, PPS=5.3 μm) at 1000 m/min. The coated paper results are shown in Table 15.

TABLE 15

| | 3-g/m$^2$ internal layer | 2-g/m$^2$ internal layer | No internal layer |
|---|---|---|---|
| Iso Brightness | 103.2 | 103.5 | 103 |
| PPS smoothness | 1.3 | 1.3 | 1.5 |
| Opacity | 88.3 | 88.6 | 88.4 |
| Paper Gloss 75° | 56 | 55 | 56 |
| Ink Gloss 75°, 1.6 g/m$^2$ | 89 | 87 | 84 |
| IGT dry | 109 | 100 | 75 |
| New wet pick: ink transfer | 64 | 68 | 61 |
| New wet pick: ink refusal | 29 | 29 | 25 |
| New wet pick: wet pick | 7 | 3 | 14 |
| Ink set off after 15 sec | .76 | 0.74 | 0.26 |
| Ink set off after 30 sec | .35 | 0.33 | 0.04 |
| Ink set off after 60 sec | .19 | 0.11 | 0 |
| Ink set off after 120 sec | .07 | 0.01 | 0 |
| Ink pilling | 6 | 6 | 2 |
| Mottling | | | |
| Stiffness machine direction | | 0.338 | 0.387 |
| Air porosity | 2.4 ml/min | 2.8 ml/min | 7.2 ml/min |

TABLE 15-continued

| | 3-g/m$^2$ internal layer | 2-g/m$^2$ internal layer | No internal layer |
|---|---|---|---|
| Water vapor permeability G/m$^2$/24 h (for μHR = 50%) | 27.5 | 46.5 | 418 |
| Cobb water after 10 sec | 0.5 g/m$^2$ | 1.1 g/m$^2$ | 14.5 g/m$^2$ |
| Cobb Oil after 30 min | 0.5 g/m$^2$ | 0 g/m$^2$ | 8.5 g/m$^2$ |

Example 41

The method of Example 40 was repeated using Formulation 47 as the optional internal layer. The results are shown in Table 16.

TABLE 16

| | 3-g/m$^2$ internal layer | 2-g/m$^2$ internal layer | No internal layer |
|---|---|---|---|
| Iso Brightness | 100.4 | 101.1 | 100.8 |
| PPS smoothness | 1.6 | 1.5 | 1.5 |
| Opacity | 89 | 89 | 88.6 |
| Paper Gloss 75° | 55 | 56 | 55 |
| Ink Gloss 75°, 1.6 g/m$^2$ | 82 | 85 | 83 |
| IGT dry | 60 | 105 | 106 |
| New wet pick: ink transfer | 55 | 78 | 74 |
| New wet pick: ink refusal | 15 | 22 | 16 |
| New wet pick: wet pick | 30 | 0 | 10 |
| Ink set off after 15 sec | 0.47 | 0.81 | 0.73 |
| Ink set off after 30 sec | 0.08 | 0.28 | 0.21 |
| Ink set off after 60 sec | 0 | 0.03 | 0.01 |
| Ink set off after 120 sec | 0 | 0 | 0 |
| Ink pilling | 2 | 5 | 4 |
| Mottling | | | |
| Stiffness machine direction | 0.989 | 0.641 | 0.738 |
| Air porosity | 3.3 ml/min | 3.3 ml/min | 7.2 ml/min |
| Water vapor permeability G/m$^2$/24 h (for μHR = 50%) | 281 | 310 | 462 |
| Cobb water after 10 sec | 2.5 g/m$^2$ | 5.9 g/m$^2$ | 14.4 g/m$^2$ |
| Cobb Oil after 30 min | 0.8 g/m$^2$ | 1.2 g/m$^2$ | 8.6 g/m$^2$ |

Barrier properties are obvious from the data in Tables 15 and 16. Surprisingly, high barrier efficiency is achieved with only 3 or 2 g/m$^2$ barrier layers. To obtain good barrier properties using conventional paper coating techniques, like blade or film press, much higher coat weights for the barrier layer are required in order to avoid pin holes. With simultaneous multilayer curtain coating, by taking advantage of the 'supporting' effect of the other layers, a very uniform and pin-hole free barrier layer is obtained even at low coat weight.

Papers with internal barrier layers have printability at least as good as reference paper. Pick resistance is unexpectedly improved, which demonstrates a very high level of adherence of the toplayer to the hydrophobic barrier layer. The combination of very good barrier properties and offset printability is quite unique and can be of great value for paper and/or packaging applications.

Examples 42, 43, 44, and Comparative E

These examples demonstrate simultaneous multilayer curtain coating onto paperboard. Paperboard coatings are relatively thicker and thus the coating speeds are generally slower than for paper. The application of a single thick coating layer (>20 g/m$^2$) at high speed through a single slit or nozzle can lead to problems due to flow instabilities and turbulence that occur at high flow rates of the coating formulation. These problems can be avoided for a multilayer curtain coating by dividing the coating flow through several slots or nozzles and then combining the layers to form a single thick layer. In addition, the paperboard substrate can be quite rough and is typically darker than a paper substrate, especially if there is a high recycle fiber content in the paperboard. Curtain coating with its contour like coverage is very well suited for paperboard coatings.

Example 42 and Comparative Experiment E

A simultaneous multilayer curtain coating was applied to paperboard and compared with two sequential single-layer curtain coatings of the same paperboard.

Example 42

In this example a 26 g/m$^2$ coating was applied as a two-layer curtain in which 13 g/m$^2$ of Formulation 17 was applied as the bottom layer and 13 g/m of Formulation 39 was applied as the top layer. Formulation 39 had the some composition as Formulation 17. These formulations contained very high solids compared to typical coatings on paperboard. The coating was applied to a 188 g/m$^2$ paperboard basestock at 600 m/min and produced a paperboard with a crater-free surface.

Comparative Experiment E

Example 42 was repeated except that the same 13 g/m$^2$ top layer was applied twice in two sequential passes, with a drying step between the two passes, to give a 26 g/m$^2$ total coat weight. Even at a relatively low speed of 600 m/min the coating that resulted from two sequential passes had severe cratering while the 26 g/m$^2$ multi-layer curtain coating was crater free.

Example 43

This example uses a three layer curtain coating to apply a very thick layer (34 g/m$^2$) uniformly in a single coating pass. A coating of this coat weight would be difficult to apply using a blade coating process. The three-layer coating was made by combining 2 g/m$^2$ of Formulation 6 as the bottom layer, 27 g/m$^2$ of Formulation 48 as the internal layer and 5 g/m$^2$ of Formulation 40 as the top layer. This three-layer coating was applied at 700 m/min to a 250 g/m$^2$ recycled fiber paperboard.

Example 44

In this example a very thin brightness-enhancing functional layer was employed as the internal layer for a multilayer coated paperboard. A simultaneous two-layer control sample was made using 15 μm$^2$ of Formulation 6 as the bottom layer and 7 g/m$^2$ of Formulation 41 as the top layer. The experimental example was a simultaneous three-layer curtain coating of 15 g/m$^2$ of Formulation 6 as the bottom layer, 0.5 g/m$^2$ of Formulation 49 as the internal layer and 7 g/m$^2$ of Formulation 41 as the top layer. Both coatings were applied at 700 m/min to a 250 g/m recycled fiber paperboard. Having the brightness enhancing internal layer resulted in a pronounced increase of whiteness (106.5 versus 96.2).

The invention claimed is:

1. A process comprising forming a composite, multilayer free flowing curtain, the curtain having a solids content of from at least about 45 weight percent to about 75 weight percent, and contacting the curtain with a continuous web substrate of basepaper or baseboard, wherein the velocity of the web is from at least about 1400 m/min. to about 3200 m/min., and wherein a coated paper or paperboard is produced that has an average crater density of not more than 10 craters per $cm^2$.

2. The process of claim 1 wherein the substrate is neither precoated nor pre-calendered.

3. The process of claim 1 wherein the substrate prior to coating has a surface roughness of at least 5 micron.

4. The process of claim 1 wherein the curtain has a top layer having a coat weight of not more than 1 $g/m^2$.

5. The process of claim 1, wherein at least one of the layers forming the composite free falling curtain comprises a binder.

6. The process of claim 1 wherein each layer has a coat weight of less than 30 $g/m^2$.

7. The process of claim 1 wherein at least 2 layers have the same composition.

8. The process of claim 1 wherein at least one layer has a coat weight of at most 5 $g/m^2$.

9. The process of claim 1 wherein at least one layer has a coat weight of at most 2 $g/m^2$.

10. The process of claim 1 wherein a coated paper or paperboard is formed and at least one layer serves a hiding function.

11. The process of claim 1 wherein the curtain has a top layer having a coat weight of not more than 2 $g/m^2$.

12. The process of claim 1 wherein the web substrate is not precalendered.

13. The process of claim 1 wherein the web substrate is not precoated.

14. The process of claim 1 wherein the web has a velocity of at least 1500 meters per minute.

15. The process of claim 1 wherein the web has a velocity of at least 1700 meters per minute.

16. The process of claim 1 wherein the web has a velocity of at least 2000 meters per minute.

17. The process of claim 1 wherein the viscosity of at least one layer is at least 20 cps.

18. The process of claim 1 wherein the viscosity of at least one layer is at least 200 cps.

19. The process of claim 1 wherein the viscosity of at least two layers is at least 200 cps.

20. The process of claim 1 wherein the curtain comprises at least one internal layer.

21. The process of claim 1 wherein the process produces a coated printing paper.

22. The process of claim 1 wherein the process produces a coated paperboard suitable for printing.

23. The process of claim 1 wherein at least one layer of the curtain comprises polyvinyl alcohol.

24. The process of claim 1 wherein the curtain comprises at least a top layer and an interface layer, and at least the interface layer comprises polyvinyl alcohol.

25. The process of claim 1 wherein the curtain has at least 2 layers and has a total coat weight of at most 10 $g/m^2$.

26. The process of claim 25 wherein the curtain has at least 3 layers.

27. The process of claim 1, wherein at least one of the layers forming the composite free falling curtain is pigmented.

28. The process of claim 1, wherein at least one layer of the curtain is pigmented, and at least one pigment comprises clay, talc, a carbonate, or $TiO_2$.

29. The process of claim 1, wherein the solids content of at least one of the layers forming the composite free falling curtain is at least 60 wt-percent.

30. The process of claim 1 wherein the solids content of the curtain is at least 50 weight percent.

31. The process of claim 1 wherein the solids content of the curtain is at least 55 weight percent.

32. The process of claim 1 wherein the solids content of the curtain is at least 60 weight percent.

33. The process of claim 1 wherein the solids content of the curtain is at least 70 weight percent.

34. The process of claim 1 wherein at least one layer of the curtain is tacky.

35. The process of claim 1 wherein the curtain comprises at least 3 layers.

36. The process of claim 1 wherein the curtain comprises at least 4 layers.

37. The process of claim 1 wherein the curtain comprises at least 5 layers.

38. The process of claim 1 wherein the curtain comprises at least 6 layers.

39. The process of claim 1, wherein the coat weight of each layer is from 0.1-30 $g/m^2$.

40. The process of claim 1, wherein the coat weight of the top layer is from 0.1-30 $g/m^2$ and the coat weight of the layer contacting the basepaper or baseboard is from 0.1-30 $g/m^2$.

41. The process of claim 1, wherein at least one of the coating layers impart functionality selected from printability properties, barrier properties, optical properties, release properties, and adhesive properties.

42. The process of claim 41 wherein the coating layers impart grease barrier properties, oil barrier priorities, or both.

43. The process of claim 41 wherein the paper produced has a layer with a coat weight of 1 $g/m^2$ or less, and wherein that layer contains at least 3 weight percent, based on the weight of the layer, of an optical brightening additive.

44. The process of claim 1, wherein the coated paper or paperboard has a gloss of less than 45.

45. The process of claim 1, wherein the top layer comprises a synthetic polymer pigment.

46. The process of claim 1, wherein sizing and coating are conducted simultaneously.

47. The process of claim 1, wherein the at least one layer of the curtain comprises an optical brightening agent.

48. The process of claim 1, wherein the curtain comprises at least one coating layer comprising a pigment and a binder.

49. The process of claim 1, wherein the coat weight of the top layer is lower than the total coat weight of the layer(s) beneath it.

50. The process of claim 1 wherein the coat weight of the top layer is less than 5 $g/m^2$.

51. The process of claim 1 wherein the coat weight of the top layer is less than 3 $g/m^2$.

52. The process of claim 1, wherein the top layer comprises a glossing formulation comprising at least one gloss additive selected from synthetic polymer pigments and gloss varnishes.

53. The process of claim 1, wherein the top layer comprises a pigment and a binder, wherein the pigment is a synthetic polymer pigment, and wherein the binder is a latex.

54. The process of claim 1 wherein at least one layer of the curtain comprises a pigment selected from one or more pigments from the group consisting of clay, kaolin, talc, calcium carbonate, titanium dioxide, satin white, synthetic polymer pigment, zinc oxide, barium sulphate, gypsum, silica, alumina trihydrate, mica, and diatomaceous earth.

55. The process of claim 1, wherein at least one of the layers forming the composite free falling curtain comprises a binder, and the binder is selected from one or more binders from the group consisting of a carboxylated latex, styrene-butadiene latex, styrene-acrylate latex, styrene-butadiene-acrylonitrile latex, styrene-maleic anhydride latex, styrene-acrylate-maleic anhydride latex, polysaccharides, proteins, polyvinyl pyrrolidone, polyvinyl alcohol, polyvinyl acetate, cellulose and cellulose derivatives.

56. The process of claim 1 wherein the curtain comprises a layer that imparts functionality, and that layer comprises one or more components selected from the group consisting of a polymer of ethylene acrylic acid, a polyurethane, an epoxy resin, a polyester, a polyolefin, a styrene butadiene latex, a carboxylated styrene butadiene latex, a styrene acrylate latex, a carboxylated styrene acrylate latex, a starch, a protein, a styrene-acrylic copolymer, a styrene maleic anhydride latex, a polyvinyl alcohol, a polyvinyl acetate, a carboxymethyl cellulose, a silicone, a wax and microcapsules.

57. The process of claim 1 wherein the top layer of the curtain has a lower coat weight than any other layer of the curtain.

58. The process of claim 1 wherein the bottom layer of the curtain has a lower coat weight than any other layer of the curtain.

59. The process of claim 1 wherein the total coat weight of the curtain is at least about 26 $g/m^2$.

60. The process of claim 1 wherein the substrate is basepaper.

61. The process of claim 1 wherein at least one layer of the curtain comprises a synthetic polymeric pigment.

62. The process of claim 61 wherein the synthetic polymeric pigment comprises a solid synthetic polymeric pigment.

63. The process of claim 61 wherein the synthetic polymeric pigment comprises a hollow synthetic polymeric pigment.

64. The process of claim 61 wherein each layer of the curtain comprises a synthetic polymeric pigment.

65. The process of claim 64 wherein the synthetic polymeric pigment comprises a solid synthetic polymeric pigment.

66. The process of claim 64 wherein the synthetic polymeric pigment comprises a hollow synthetic polymeric pigment.

67. The process of claim 64 wherein the process produces a coated printing paper having a multilayer coating and a gloss of at least 70.

68. The process of claim 64 wherein the curtain comprises at least 3 layers.

69. The process of claim 61 wherein the top layer comprises a synthetic polymer pigment.

70. The process of claim 61 wherein at least 2 layers comprise a synthetic polymeric pigment.

71. The process of claim 1 wherein the curtain comprises at least a top layer and an interface layer, and wherein the interface layer of the curtain comprises starch.

72. The process of claim 1 wherein the curtain comprises at least a top layer and an interface layer, and wherein the interface layer of the curtain comprises at least one modified starch.

73. A process of manufacturing multilayer coated papers and paperboards that are especially suitable for printing, packaging and labeling purposes, but excluding photographic papers and pressure sensitive copying papers, in which at least two liquid layers selected from aqueous emulsions or suspensions are formed into a composite, free-falling curtain, the curtain having a solids content of from at least about 45 weight percent to about 75 weight percent, and a continuous web of basepaper or baseboard, the web having a velocity of from at least about 1400 m/min to about 3200 m/min, is coated with the composite coating curtain.

74. A process comprising: forming a composite, multilayer free-flowing curtain, the curtain having a solids content of from at least about 45 weight percent to about 75 weight percent; and contacting the curtain with a continuous web substrate of base paper or paperboard, the web having a velocity of from at least about 1400 meters per minute to about 3200 m/min.

75. The process of claim 74 wherein the contacting is done in such a manner that the substrate is coated with the composite curtain to form a coated paper suitable for printing.

76. The process of claim 74 wherein the contacting is done in such a manner that the substrate is coated with the composite curtain to form a coated paperboard suitable for printing.

77. A paper or paperboard obtainable by the process of claim 74.

78. A coating process comprising contacting a moving web of paper with a composite multilayer curtain having a solids content of at least 45 percent to about 75 weight percent, wherein the web has a velocity of at least 800 meters per minute to about 3200 m/min., and wherein the curtain has a top layer having a coat weight of not more than 1 $g/m^2$.

79. The process of claim 78 wherein the curtain has at least 2 component layers, wherein a first layer is oriented such that it comes into direct contact with the web, has a coat weight of from about 0.1 to about 60 $g/m^2$, and contains from about 0.2 to about 10 weight percent polyvinyl alcohol based on the total composition of the first layer, wherein at least one layer other than the first layer contains a pigment and a binder.

80. The process of claim 78 wherein the process produces a coated printing paper having a multilayer coating and a gloss of at least 70.

81. The process of claim 80 wherein the top layer comprises a synthetic polymer pigment.

82. The process of claim 78 wherein the curtain comprises at least a top layer and an interface layer, and wherein the interface layer of the curtain comprises at least one water-soluble polymer.

83. The process of claim 82 wherein the water-soluble polymer comprises a polyethylene oxide.

84. The process of claim 78 wherein at least one layer of the curtain comprises a synthetic polymeric pigment.

85. The process of claim 84 wherein the synthetic polymeric pigment comprises a solid synthetic polymeric pigment.

86. The process of claim 84 wherein the synthetic polymeric pigment comprises a hollow synthetic polymeric pigment.

87. The process of claim 84 wherein each layer of the curtain comprises a synthetic polymeric pigment.

88. The process of claim 87 wherein the synthetic polymeric pigment comprises a solid synthetic polymeric pigment.

89. The process of claim 87 wherein the synthetic polymeric pigment comprises a hollow synthetic polymeric pigment.

90. The process of claim 84 wherein at least 2 layers of the curtain comprise a synthetic polymeric pigment.

91. The process of claim 84 wherein the curtain comprises at least 3 layers and at least 3 layers of the curtain comprise a synthetic polymeric pigment.

* * * * *